US012598299B2

(12) United States Patent
Poirier et al.

(10) Patent No.: US 12,598,299 B2
(45) Date of Patent: Apr. 7, 2026

(54) LOSSLESS MODE FOR VERSATILE VIDEO CODING

(71) Applicant: INTERDIGITAL CE PATENT HOLDINGS, SAS, Paris (FR)

(72) Inventors: Tangi Poirier, Thorigne-Fouillard (FR); Fabrice Leleannec, Betton (FR); Karam Naser, Mouazé (FR); Edouard Francois, Bourg des Comptes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/659,336

(22) Filed: May 9, 2024

(65) Prior Publication Data

US 2024/0291987 A1 Aug. 29, 2024

Related U.S. Application Data

(63) Continuation of application No. 17/618,090, filed as application No. PCT/EP2020/066647 on Jun. 16, 2020, now Pat. No. 12,010,309.

(30) Foreign Application Priority Data

Jun. 20, 2019 (EP) .................................... 19305799

(51) Int. Cl.
*H04N 19/12* (2014.01)
*H04N 19/176* (2014.01)
*H04N 19/182* (2014.01)

(52) U.S. Cl.
CPC ........... *H04N 19/12* (2014.11); *H04N 19/176* (2014.11); *H04N 19/182* (2014.11)

(58) Field of Classification Search
CPC .... H04N 19/12; H04N 19/154; H04N 19/176; H04N 19/182; H04N 19/70
See application file for complete search history.

(56) References Cited

U.S. PATENT DOCUMENTS 9,497,465 B2 11/2016 Kim et al.
10,057,575 B2 8/2018 Lee et al.
(Continued)

FOREIGN PATENT DOCUMENTS

CN 105120272 A 12/2015
CN 108184117 A 6/2018
(Continued)

OTHER PUBLICATIONS

Anonymous, "Generic Coding of Moving Pictures and Associated Audio information: Video", International Organization for Standardization (ISO) and the International Electrotechnical Commission (IEC), International Standard 13818-2, Recommendation ITU-T H.262, Document ISO 13818-2, 1995, 255 pages.
(Continued)

*Primary Examiner* — Jessica M Prince
(74) *Attorney, Agent, or Firm* — Condo Roccia Koptiw LLP

(57) ABSTRACT

A lossless coding mode is proposed in a video coding system comprising a plurality of coding tools, some being lossy by design, some of which can be adapted to become lossless or near lossless. To enable a lossless mode in such system, it is proposed to disable the tools that are lossy by design and use only lossless tools, to adapt some tools to enable lossless coding, and adapt some tools to enable near-lossless coding so that a secondary lossless coding may be applied after residual coding. In some embodiments, a type of residual coding is determined by, when an information indicates that a transform skip residual coding is used, obtaining a flag representative of a special mode, and when this flag is true, determine that regular residual coding must be used instead of the transform skip residual coding that should be used.

6 Claims, 18 Drawing Sheets

(56) References Cited

U.S. PATENT DOCUMENTS

| | | | |
|---|---|---|---|
| 10,264,283 B2 | 4/2019 | Lee et al. | |
| 10,425,647 B2 | 9/2019 | Lai et al. | |
| 2013/0003838 A1 | 1/2013 | Gao et al. | |
| 2013/0294524 A1 | 11/2013 | Van Der Auwera et al. | |
| 2015/0063443 A1 | 3/2015 | Matsumura | |
| 2018/0007369 A1 | 1/2018 | Jung et al. | |
| 2020/0228815 A1 | 7/2020 | Xu et al. | |
| 2020/0260098 A1 | 8/2020 | Karczewicz et al. | |
| 2020/0329257 A1 | 10/2020 | Zhao et al. | |
| 2021/0266585 A1 | 8/2021 | Liu et al. | |
| 2021/0368198 A1 | 11/2021 | Zhang et al. | |
| 2021/0385478 A1* | 12/2021 | Yoo | H04N 19/103 |
| 2021/0400299 A1 | 12/2021 | Zhu et al. | |
| 2022/0046247 A1* | 2/2022 | Yoo | H04N 19/196 |
| 2022/0078424 A1* | 3/2022 | Zhang | H04N 19/176 |
| 2022/0078433 A1 | 3/2022 | Yoo et al. | |
| 2022/0159294 A1* | 5/2022 | Yoo | H04N 19/157 |
| 2022/0191543 A1 | 6/2022 | He et al. | |
| 2022/0256160 A1* | 8/2022 | Yoo | H04N 19/132 |

FOREIGN PATENT DOCUMENTS

| | | |
|---|---|---|
| CN | 108632611 A | 10/2018 |
| JP | 2014520493 A | 8/2014 |
| RU | 2635064 C2 | 11/2017 |
| WO | 2020145798 A1 | 7/2020 |
| WO | 2020232269 A1 | 11/2020 |
| WO | 2020251260 A1 | 12/2020 |

OTHER PUBLICATIONS

Bross, et al., JVET-M0464v4 "Non-CE8: Unified Transform Type Signaling and Residual Coding for Transform Skip", Jan. 9-18, 2019, 13 pages.

Bross, et al., "Versatile Video Coding (Draft 5)", JVET-N1001-v7, Joint Video Experts Team (JVET) of ITU-T SG 16 WP 3 and ISO/IEC JTC 1/SC 29/WG 11, 14th Meeting: Geneva, Switzerland, Mar. 19, 2019, 383 pages.

ITU-T, "High Efficiency Video Coding", Recommendation ITU-T H.265, Series H: Audiovisual and Multimedia Systems, Infrastructure of Audiovisual Services—Coding of Moving Video, Oct. 2014, 540 pages.

ITU-T, "Information Technology—Generic Coding of Moving Pictures and Associated Audio Information: Systems", H.222.0, Series H: Audiovisual and Multimedia Systems, Infrastructure of Audiovisual Services—Transmission Multiplexing and Synchronization, Jun. 2012, 228 pages.

Koo, et al., "CE6: Reduced Secondary Transform (RST) (CE6-3.1)", JVET-N-193, Joint Video Experts Team (JVET) of ITU-T SG 16 WP 3 nd ISO/IECJTC 1/SC 29/WG 11, 14th Meeting: Geneva, Switzerland, Mar. 19, 2019, 19 pages.

Tan, et al., "Non-RCE3: Unified Lossless Residual Coding", JCTVC-O0087, Joint Collaborative Team on Video Coding (JCT-VC) of ITU-T SG 16 WP 3 and ISO/IEC JTC 1/SC 29/WG 11 15th Meeting: Geneva, Switzerland, Oct. 23, 2013, 3 pages.

Van Der Auwera, et al., "CE7-Related: Joint Coding of Chroma Residuals", JVET-N0347-v3, Qualcomm Inc., Joint Video Experts Team (JVET) of ITU-T SG 16 WP 3 and ISO/IEC JTC 1/SC 29/WG 11, 14thMeeting: Geneva, CH, Mar. 19-27, 2019, pp. 1-11.

Van Der Auwera, et al., "Lossless Coding and Loop Filter Control for Transform Skip", JCTVC-J0435, Joint Collaborative Team on Video Coding (JCT-VC) of ITU-T SG 16 WP 3 and ISO/IEC JTC 1/SC 29/WG 11, 10th Meeting: Stockholm, Sweden, Jul. 11, 2012, 8 pages.

Tsukuba, Takeshi et al., JVET-O0081-v1 (Joint Video Experts Team), of ITU-T SG 16 WP 3 and ISO/IEC JTC 1/SC 29/WG11; 15th Meeting: Gothenburg, SE, Jul. 3-12, 2019, 4 pages.

Bross, et al., "Versatile Video Coding (Draft 4)", JVET-M1001-V7, Editors, Joint Video Experts Team (JVET) of ITU-T SG 16 WP 3 and ISO/IEC JTC 1/SC 29/WG 11, 13th Meeting: Marrakech, MA, Jan. 9-18, 2019, 300 pages.

* cited by examiner

Reduced
Transform

Residual $\longrightarrow$        T x [ ]        $\longrightarrow$ Coefficient

Reduced Inv.
Transform

Coefficient $\longrightarrow$        $T^t$ x [ ]        $\longrightarrow$ Residual

Figure 10A
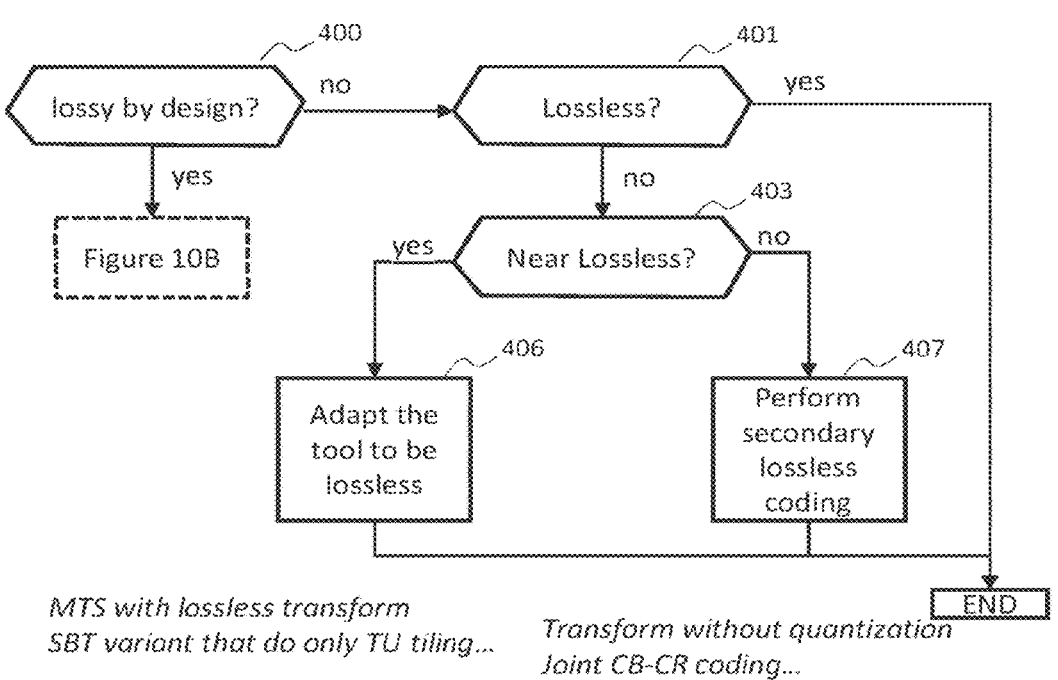
MTS with lossless transform
SBT variant that do only TU tiling...
Transform without quantization
Joint CB-CR coding...
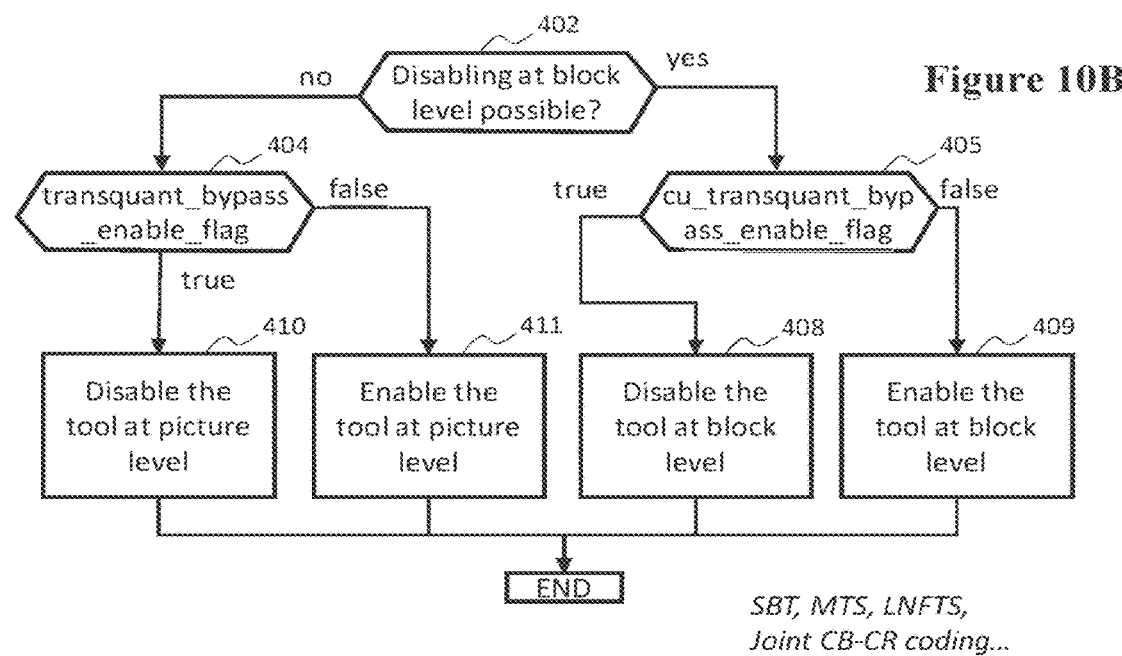
Figure 10B
SBT, MTS, LNFTS,
Joint CB-CR coding...

Luma CTU

| L1 | L2 | L3 |

| L4 | L5 |
| | L6 |

Chroma CTU

| C1 | C2 |
| C3 | C4 | C5 |

LOSSLESS MODE FOR VERSATILE VIDEO CODING

CROSS-REFERENCE TO RELATED APPLICATIONS

This application is a continuation of U.S. application Ser. No. 17/618,090 (now U.S. Pat. No. 12,010,309), which is the National Phase entry under 35 U.S.C. § 371 of International Application No. PCT/EP2020/066647, filed Jun. 16, 2020, which claims priority from European Patent Application No. 19305799.9, filed Jun. 20, 2019, the disclosures of each of which are incorporated by reference herein in their entireties.

TECHNICAL FIELD

The disclosure is in the field of video compression, and at least one embodiment relates more specifically to a lossless mode for Versatile Video Coding (VVC).

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning for example. To reconstruct the video, the compressed data is decoded by inverse processes corresponding to the prediction, transform, quantization and entropy coding.

SUMMARY

A lossless coding mode is proposed in a video coding system comprising a plurality of coding tools, some of which are lossy by design, some of which can be adapted to become lossless or near lossless. To enable a lossless mode in such video coding system, it is proposed to disable the tools that are lossy by design and use only lossless tools, to adapt some tools to enable lossless coding, and adapt some tools to enable near-lossless coding so that a secondary lossless coding may be applied after residual coding and thus provide lossless coding.

In a specific embodiment, a method to determine the type of residual coding comprises, in the case where an information indicates that a transform skip residual coding is used, obtain a flag representative of a special mode, and when the flag representative of a special mode is true, determine that regular residual coding must be used instead of the transform skip residual coding that should be used.

According to a first aspect, a method for determining the type of residual coding comprises, in the case where an information indicates that a transform skip residual coding is used, obtaining a flag representative of a special mode, and when the flag representative of a special mode is true, determining that regular residual coding must be used instead of the transform skip residual coding that should be used.

According to a second aspect, a video encoding method comprises, for a block of a video, determining the type of residual coding according to the method of first aspect.

According to a third aspect, a video decoding method comprises, for a block of a video, determining the type of residual coding according to the method of first aspect.

According to a fourth aspect, a video encoding apparatus comprises an encoder configured to determine the type of residual coding according to the method of first aspect.

According to a fifth aspect, a video decoding apparatus comprises a decoder configured to determine the type of residual coding according to the method of first aspect.

One or more of the present embodiments also provide a non-transitory computer readable storage medium having stored thereon instructions for encoding or decoding video data according to at least part of any of the methods described above. One or more embodiments also provide a computer program product including instructions for performing at least part of any of the methods described above.

BRIEF DESCRIPTION OF THE DRAWINGS

FIGS. 10A and 10B illustrate an example flowchart according to at least an embodiment.

DETAILED DESCRIPTION

Various embodiments relate to a post-processing method for a predicted value of a sample of a block of an image, the value being predicted according to an intra prediction angle, wherein the value of the sample is modified after the prediction so that it is determined based on a weighting of the difference between a value of a left reference sample and the obtained predicted value for the sample, wherein the left reference sample is determined based on the intra prediction angle. Encoding method, decoding method, encoding apparatus, decoding apparatus based on this post-processing method are proposed.

Moreover, the present aspects, although describing principles related to particular drafts of VVC (Versatile Video Coding) or to HEVC (High Efficiency Video Coding) specifications, are not limited to WC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Figure 1A:
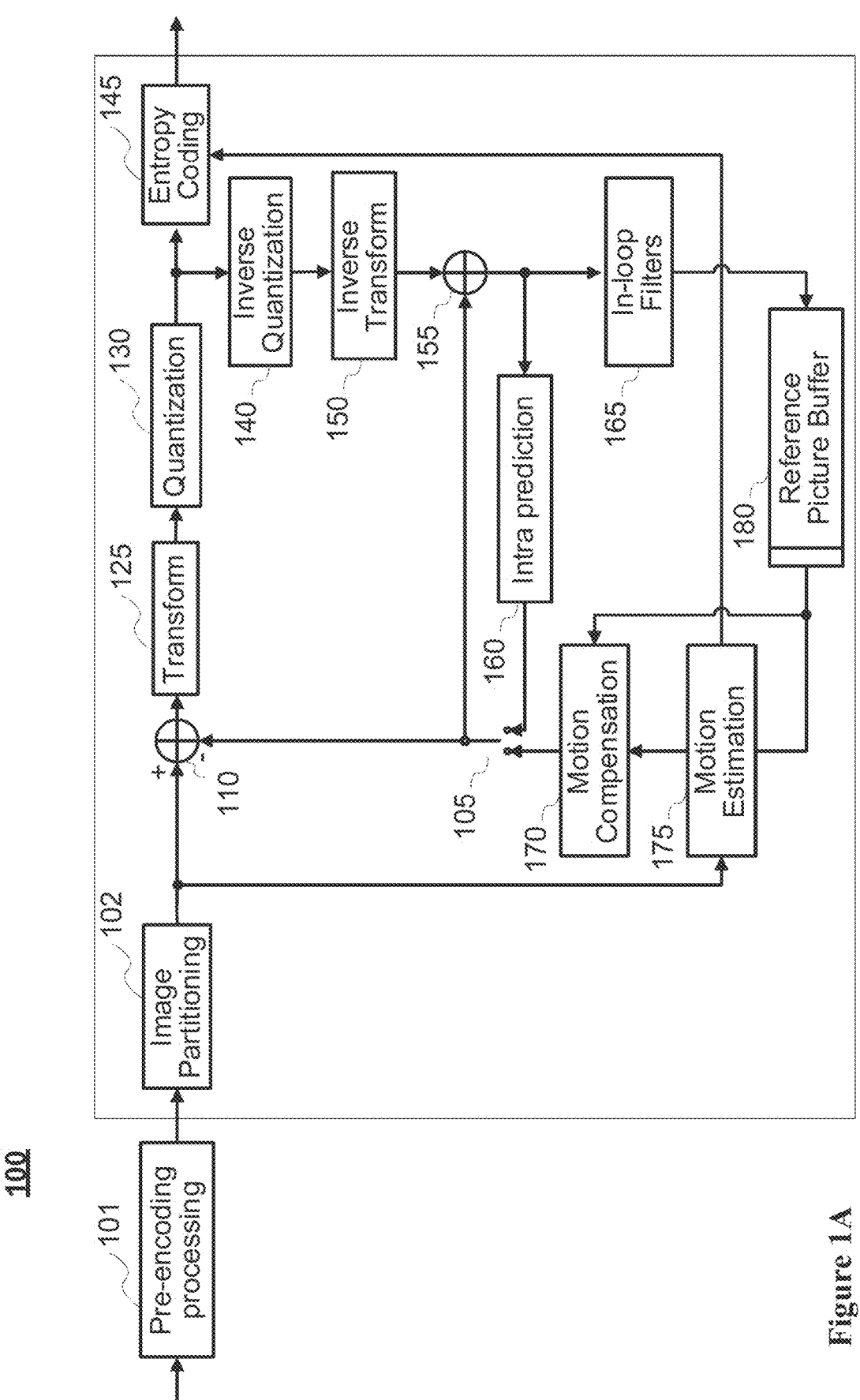
FIG. 1A illustrates a block diagram of a video encoder according to an embodiment.

FIG. 1A illustrates a video encoder 100. Variations of this encoder 100 are contemplated, but the encoder 100 is described below for purposes of clarity without describing all expected variations. Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset), Adaptive Loop-Filter (ALF) filtering to reduce encoding artifacts. The filtered image is stored at a reference picture buffer (180).

Figure 1B:
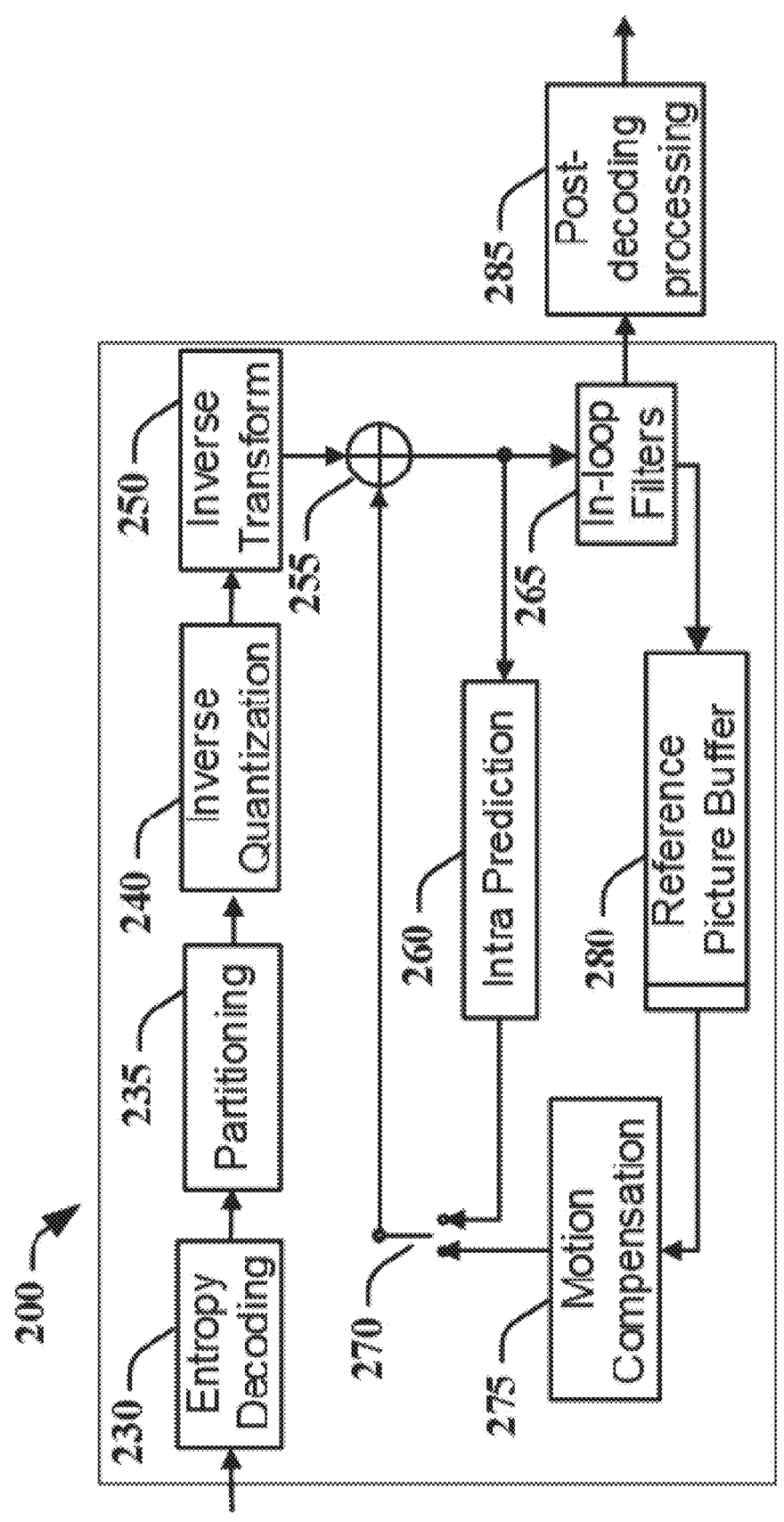
FIG. 1B illustrates a block diagram of a video decoder according to an embodiment.

FIG. 1B illustrates a block diagram of a video decoder 200. In the decoder 200, a bitstream is decoded by the decoder elements as described below. Video decoder 200 generally performs a decoding pass reciprocal to the encoding pass as described in FIG. 18. The encoder 100 also generally performs video decoding as part of encoding video data. In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

Figure 2:
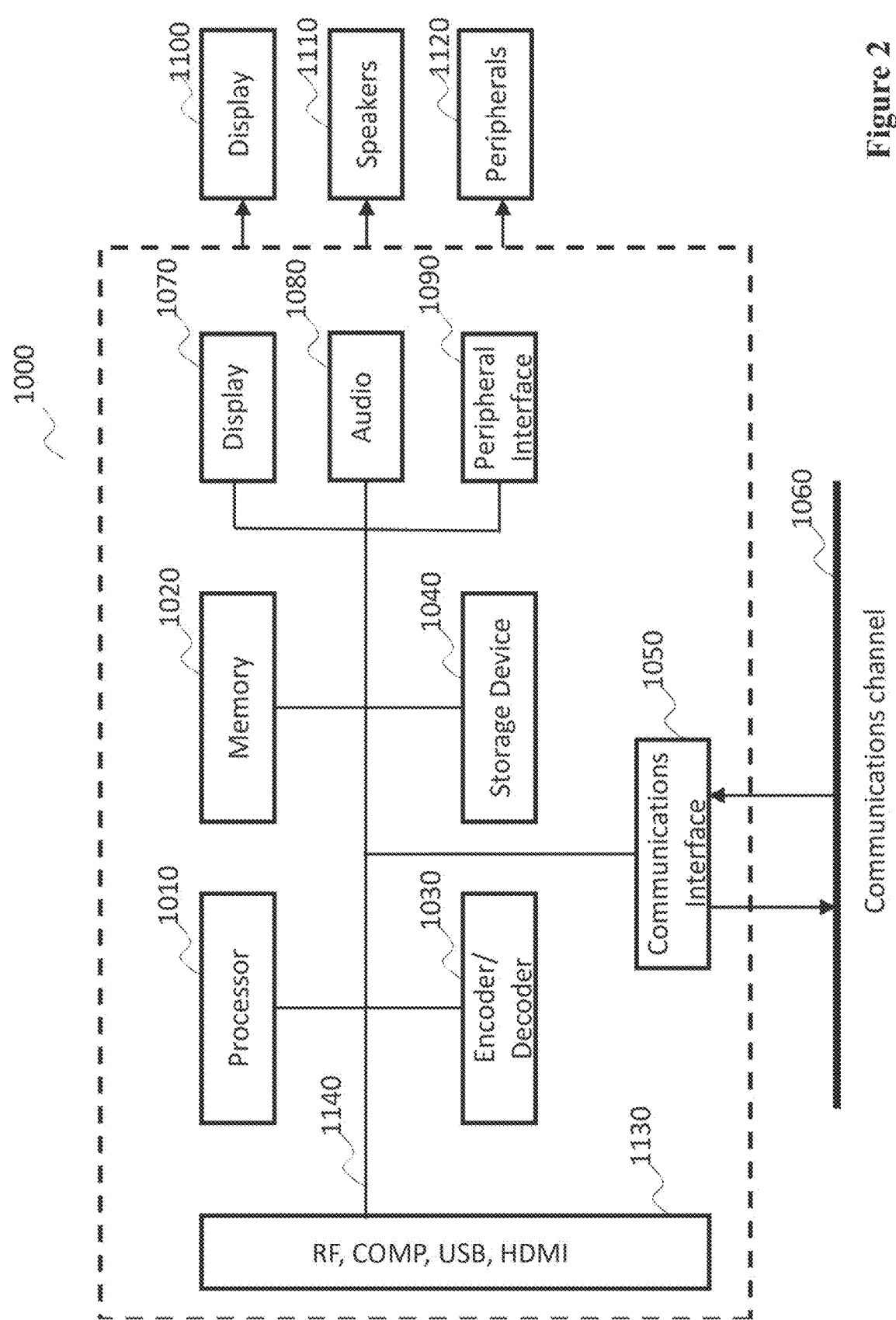
FIG. 2 illustrates a block diagram of an example of a system in which various aspects and embodiments are implemented.

FIG. 2 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 18, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

A lossless mode is available in HEVC. In this mode, transform and quantization bypass is indicated at the CU level by a flag at the beginning of the CU syntax structure. If bypass is on, then the transform and the quantizer scaling operations are skipped and the residual signal is directly coded without any degradation. Thereby this mode enables perfect reconstruction for a lossless representation of the coded block. The sample differences are encoded as if they were quantized transform coefficient levels, i.e. reusing the transform block coding with transform sub-blocks, coefficient scans, and last significant coefficient signaling. This mode can e.g. be useful for local coding of graphic content where quantization artifacts may be highly visible or not tolerable at all. The encoder may also switch to this mode if the rate distortion cost of usual transform coding, typically when using low quantization parameters, happens to exceed the rate cost of bypass coding. For CUs coded with lossless mode, post-filters are disabled.

If activated in the Sequence Parameter Set (SPS), PCM coding can be indicated on the CU level. If active for a considered CU, no prediction, no quantization and no transform are applied. Instead, the sample values of the samples in the corresponding coding blocks are directly coded into the bitstream at a PCM sample bit depth which is configured in the SPS. The granularity for the application of PCM coding can be configured between the minimum of the luma coding tree block size and 32×32 on the high end and the smallest luma coding block size on the low end. If a coding unit is coded in PCM mode, the size of other coding units in the same coding tree unit must not be smaller than the size of the PCM unit. Since by definition PCM coding enables a lossless representation of the corresponding block, the bits spent for PCM coding of a coding unit can be considered as an upper limit of the amount of bits required for encoding a CU. Hence, the encoder may switch to PCM coding in cases where the application of transform-based residual coding would exceed that limit, e.g. for exceptionally noisy content.

The lossless mode of HEVC is activated using the transquant_bypass_enabled_flag flag coded in the Picture Parameter Set (PPS) (See below in TABLE 1). This flag enables the coding of cu_transquant_bypass_flag at CU level (TABLE 2). The cu_transquant_bypass_flag specifies that the quantization, transform process and loop filter are bypassed. TABLE 1 describes PPS syntax to signal lossless coding at picture-level in HEVC.

TABLE 1

|  | Descriptor |
|---|---|
| pic_parameter_set_rbsp( ) { |  |
| pps_pic_parameter_set_id | ue(v) |
| ....... |  |
| transquant_bypass_enabled_flag | u(1) |

TABLE 2 describes Coding Unit syntax for lossless coding in HEVC.

TABLE 2

| | Descriptor |
|---|---|
| coding_unit( x0, y0, log2CbSize ) { | |
| if( transquant_bypass_enabled_flag ) | |
| cu_transquant_bypass_flag[ x0 ][ y0 ] | ae(v) |
| if( slice_type != I ) | |
| cu_skip_flag[ x0 ][ y0 ] | ae(v) |

Lossless coding may be used for an entire frame if for all CUs cu_transquant_bypass_flag is true, but it is also possible that only a region may be lossless coded. This is typically the case for mixed content with natural video with overlaid text and graphics. The text and graphics regions can be losslessly coded to maximize readability whereas the natural content can be coded in a lossy fashion.

Moreover, since the quantization is lossy by definition, it is disabled for lossless coding. The transform process (DCT-2 and DST-4 are used in HEVC) is lossy in HEVC because of rounding operations. Post-filters as deblocking filters and Sample Adaptive Offset are useless if the reconstructed signal is lossless.

Figure 3:
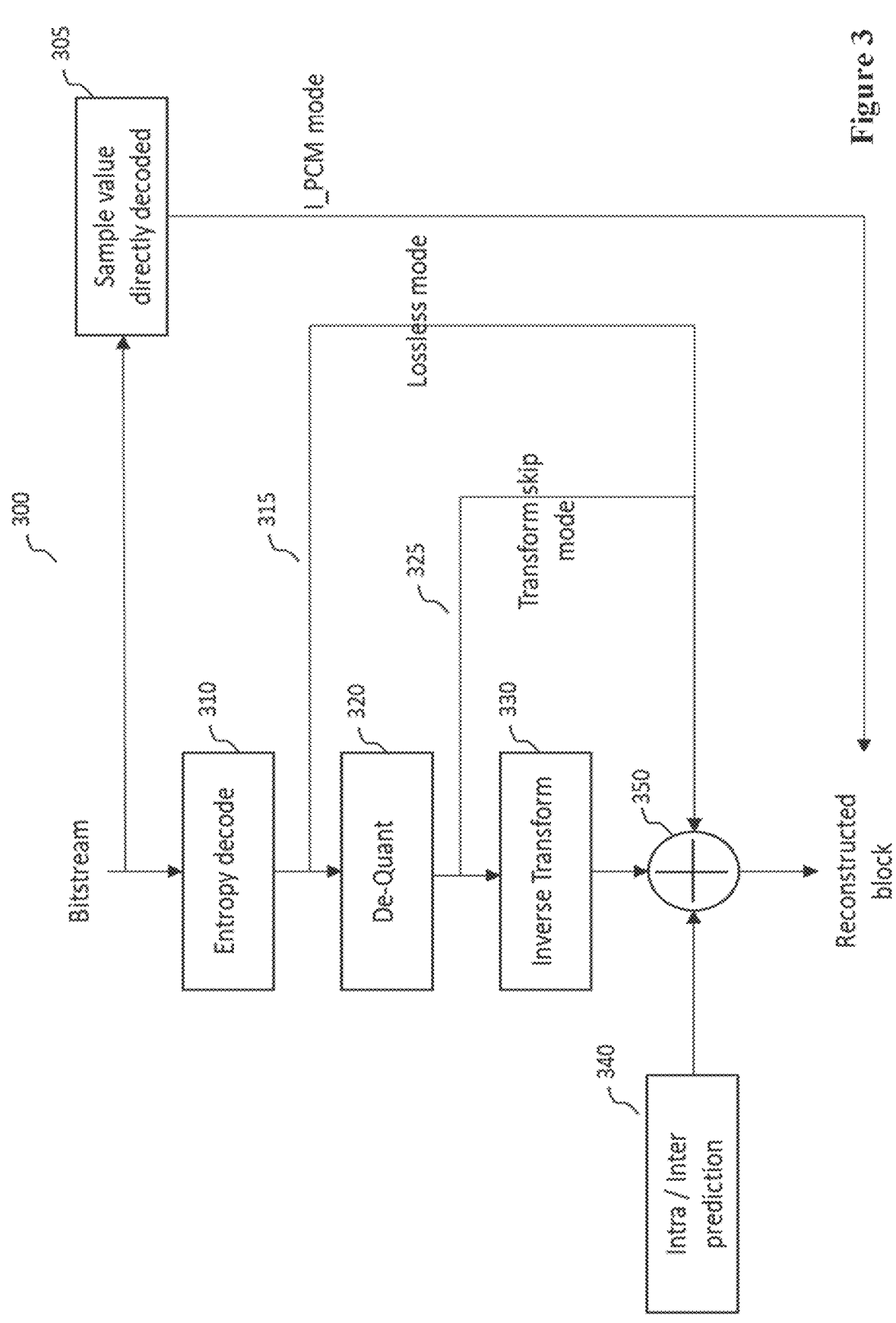
FIG. 3 illustrates a simplified block diagram of a decoding process for pulse-code modulation (PCM), lossless, and transform skip modes.

FIG. 3 illustrates an example of simplified block diagram of decoding process for PCM, lossless and Transform skip modes. The input of the decoding process 300 is the bitstream. Data are decoded from the bitstream in step 310. In particular this provides the quantized transformed coefficients, and the transform type. The inverse quantization is applied in step 320 to the quantized transformed coefficients. The inverse transform is applied in step 330 to the resulting transformed coefficients. The resulting residual is added in step 350 to the prediction signal, coming from the intra or inter prediction of step 340. The result is the reconstructed block. When I_PCM mode is selected in step 305, the samples values are directly decoded without entropy decoding. When lossless coding mode is selected, steps 320 and 330 are skipped. When transform skip mode is selected, step 330 is skipped.

In the more recent Versatile Video Coding (VVC) Test Model 4 (VTM4), large transform sizes, up to 64×64, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained thus losing this information. More precisely, this information is lost by not being encoded in the resulting bitstream, thus not being available to the decoder. For example, for an M×N transform block, with M as the block width and N as the block height, when M is equal to 64, only the left 32 columns of transform coefficients are kept. Similarly, when N is equal to 64, only the top 32 rows of transform coefficients are kept. In both examples, the remaining 32 columns or rows of transform coefficients are lost. When transform skip mode is used for a large block, the entire block is used without zeroing out any values. In practice, this consists in setting a maximum size for the transform, set to 5, as shown in the syntax excerpt from the current VVC specification (related line is set in bold font) illustrated below in TABLE 3. Therefore, a maximum actual transform size is used, set to 32 (2^5) for example in the current VVC specification. In the following this parameter will be named "max_actual_transf_size".

TABLE 3

| | Descriptor |
|---|---|
| residual_coding( x0, y0, log2TbWidth, log2TbHeight, cIdx ) { | |
| if( ( tu_mts_idx[ x0 ][ y0 ] > 0 \|\| | |
| ( cu_sbt_flag && log2TbWidth < 6 && | |
| log2TbHeight < 6 ) ) | |
| && cIdx = = 0 && log2TbWidth > 4 ) | |
| log2ZoTbWidth = 4 | |
| else | |
| log2ZoTbWidth = Min( log2TbWidth, 5 ) | |
| if( tu_mts_idx[ x0 ][ y0 ] > 0 \|\| | |
| ( cu_sbt_flag && log2TbWidth < 6 && | |
| log2TbHeight < 6 ) ) | |
| && cIdx = = 0 && log2TbHeight > 4 ) | |
| log2ZoTbHeight = 4 | |
| else | |
| log2ZoTbHeight = Min( log2TbHeight, 5 ) | |

In addition to DCT-2 which is used in HEVC, VVC adds a Multiple Transform Selection (MTS) scheme used for residual coding for both inter and intra coded blocks. The newly introduced transform matrices are DST-7 and DCT-8. In order to control the MTS scheme, separate enabling flags are specified at SPS level for intra and inter, respectively. When MTS is enabled at SPS level, a CU-level MTS index is signaled to indicate the pair of separable transforms used for the CU, among DCT-2, DST-7, DCT-8. MTS is applied only for luma. The CU-level MTS index is signaled when the following conditions are satisfied: both width and height smaller than or equal to 32 and CBF flag is equal to one To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

The block size limitation for transform skip is the same as that for MTS, which states that transform skip is applicable for a CU when both block width and height are equal to or less than 32.

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out.

Figure 4:
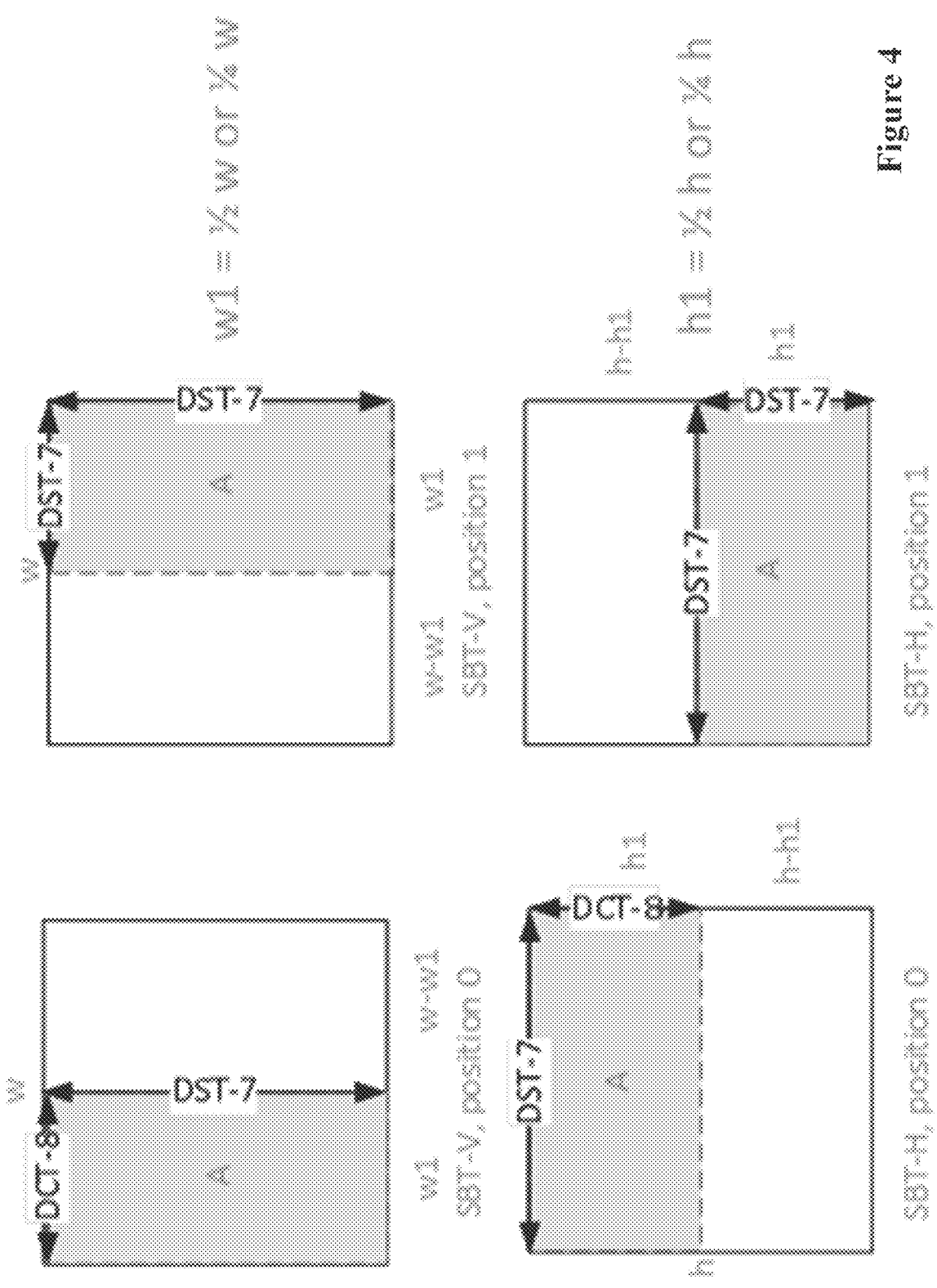
FIG. 4 illustrates horizontal and vertical transforms for each SBT position.

FIG. 4 illustrates horizontal and vertical transforms for each SBT position. Sub-Block Transform is position-dependent transform that is applied on luma transform blocks. The two positions of SBT-H (horizontal) and SBT-V (vertical) are associated with different core transforms. More specifically, the horizontal and vertical transforms for each SBT position is specified in FIG. 4. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

In VTM4, a coding tool called the luma mapping with chroma scaling (LMCS) was added as a new processing block before the loop filters. LMCS has two main components: 1) in-loop mapping of the luma component based on adaptive piecewise linear models; 2) for the chroma components, luma-dependent chroma residual scaling is applied.

Figure 5:
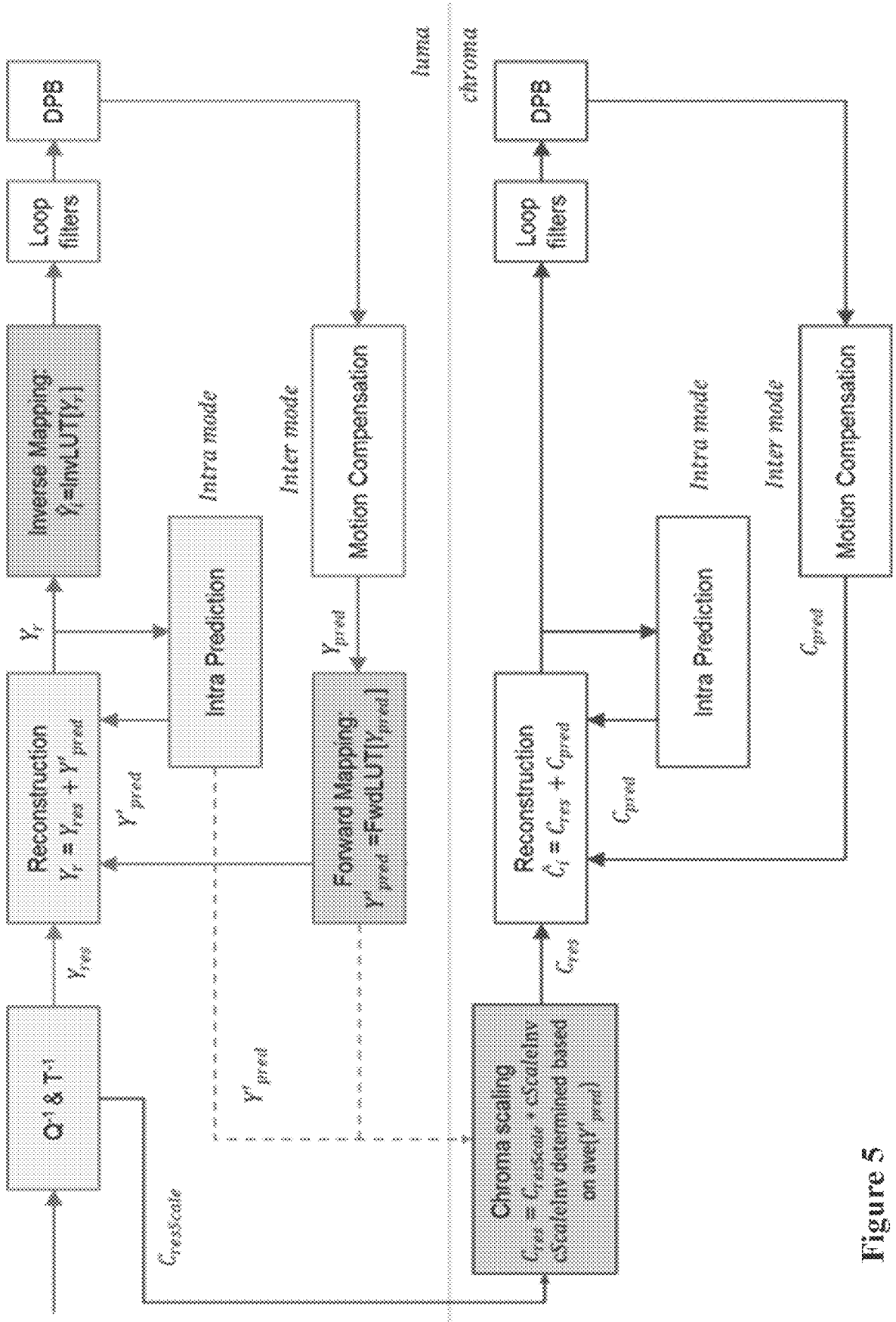
FIG. 5 shows the LMCS architecture from decoder's perspective.

FIG. 5 shows the LMCS architecture from decoder's perspective. The light-grey shaded blocks in FIG. 5 indicate where the processing is applied in the mapped domain; and these include the inverse quantization, inverse transform, luma intra prediction and adding of the luma prediction together with the luma residual. The unshaded blocks in FIG. 5 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The dark-grey shaded blocks in FIG. 5 are the new LMCS functional blocks, including forward and inverse mapping of the luma signal and a luma-dependent chroma scaling process. Like most other tools in VVC, LMCS can be enabled/disabled at the sequence level using an SPS flag.

Also known as Non-Separable Secondary Transform (NSST) or Reduced Secondary Transform (RST), a secondary transform is applied between forward primary transform and quantization (at encoder) and between de-quantization and inverse primary transform (at decoder side).

Figure 6:
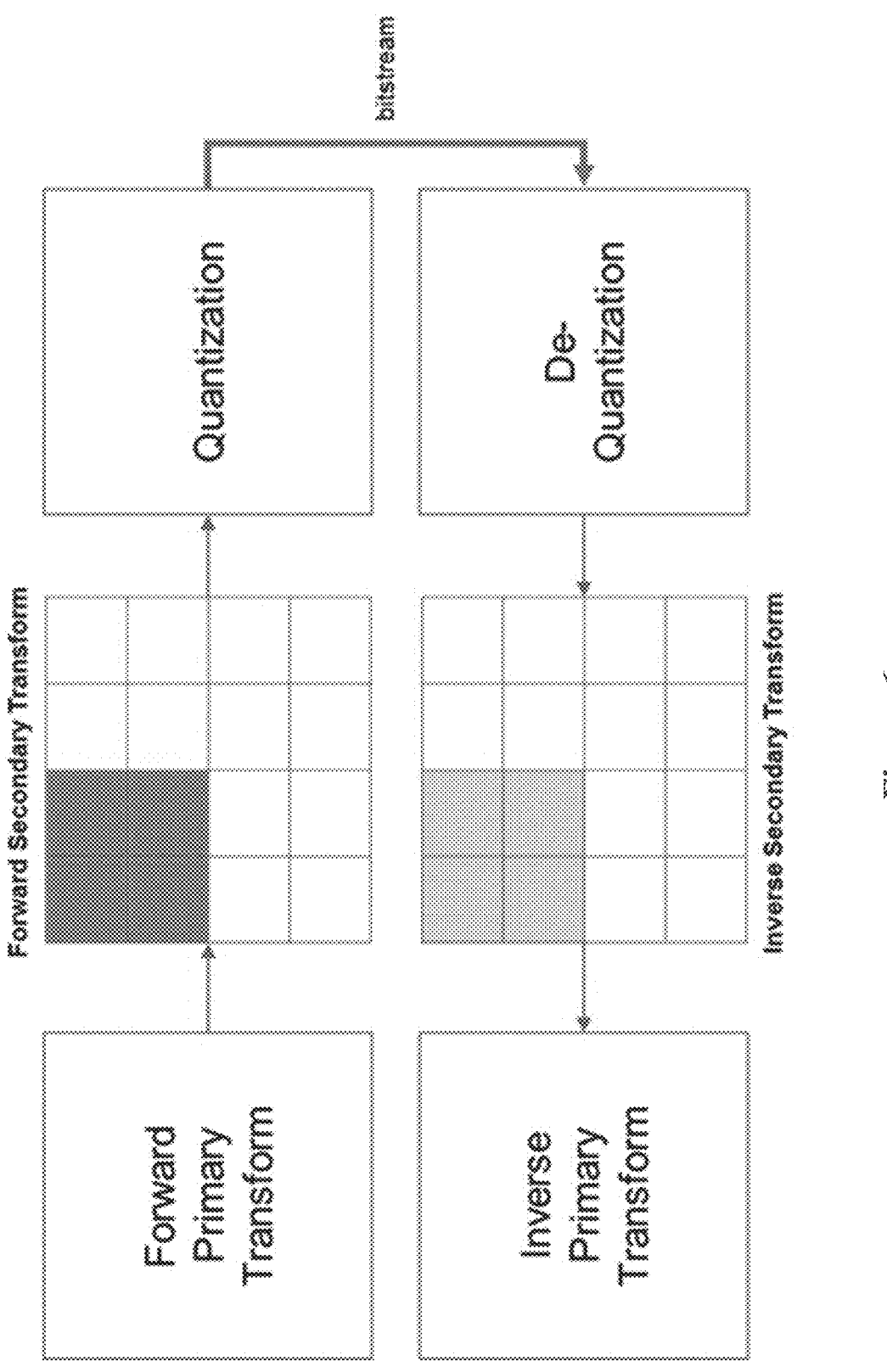
FIG. 6 illustrates the application of a secondary transform.

FIG. 6 illustrates the application of a secondary transform. In JEM, 4×4 secondary transform is applied for small blocks (i.e., min (width, height)<8) and 8×8 secondary transform is applied for larger blocks (i.e., min (width, height)>4) per 8×8 block as shown in the figure.

Application of a non-separable transform is described as follows using input as an example. The 4×4 input block is represented as the following matrix:

$$\begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

To apply the non-separable transform, this 4×4 input block X is first represented as a vector $$X: \vec{X} = [\, X_{00} \ X_{01} \ X_{02} \ X_{03} \ X_{10} \ X_{11} \ X_{12} \ X_{13} \ X_{20} \ X_{21} \ X_{22} \ X_{23} \ X_{30} \ X_{31} \ X_{32} \ X_{33} \,]^T$$

The non-separable transform is calculated as $F_\lrcorner = T \cdot X_\lrcorner$, where $F_\lrcorner$ indicates the transform coefficients vector, and T is a 16×16 transform matrix. The 16×1 coefficient vector $F_\lrcorner$ is subsequently re-organized as a 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform candidate is further specified by the explicitly signalled secondary transform index. The index is signalled in a bit-stream once per Intra CU after transform coefficients.

Figure 7:
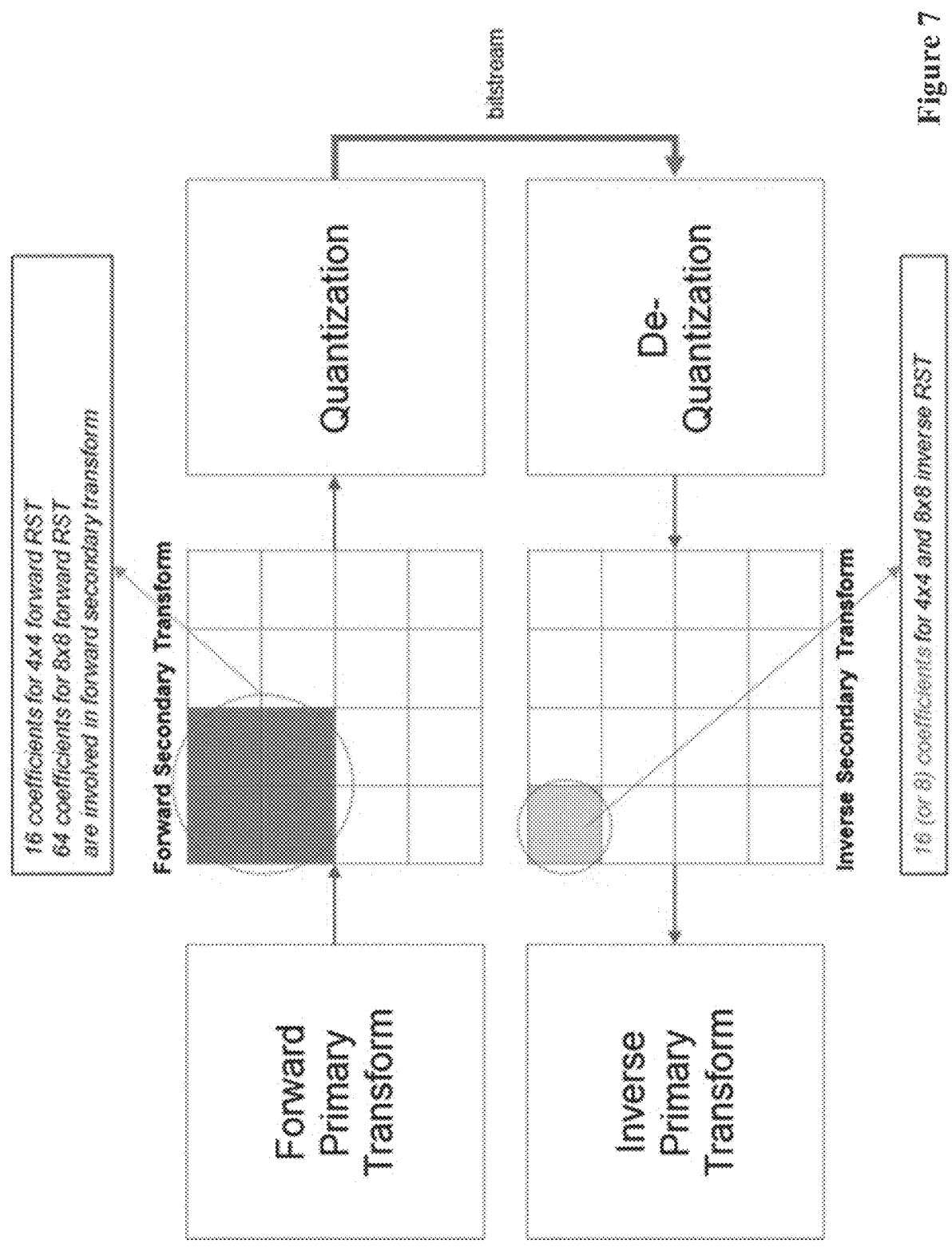
FIG. 7 illustrates Reduced Secondary Transform (RST).

FIG. 7 illustrates Reduced Secondary Transform (RST). With this technique, 16×48 and 16×16 matrices are employed for 8×8 and 4×4 blocks, respectively. For notational convenience, the 16×48 transform is denoted as RST8×8 and the 16×16 one as RST4×4. The main idea of a Reduced Transform (RT) is to map an N dimensional vector to an R dimensional vector in a different space, where R/N (R<N) is the reduction factor.

Figure 8:
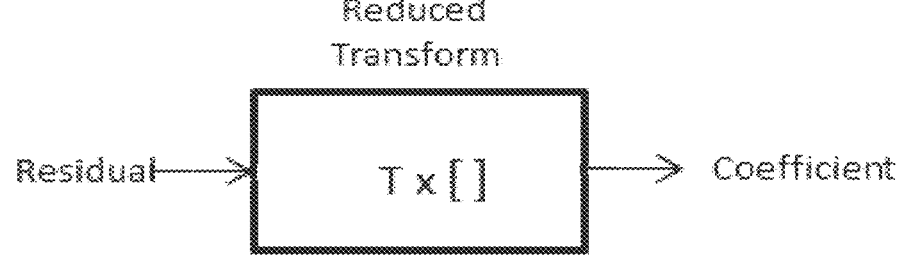
FIG. 8 illustrates the forward and inverse reduced transform.

FIG. 8 illustrates the forward and inverse reduced transform. The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The inverse transform matrix for RT is the transpose of its forward transform.

Figure 9:
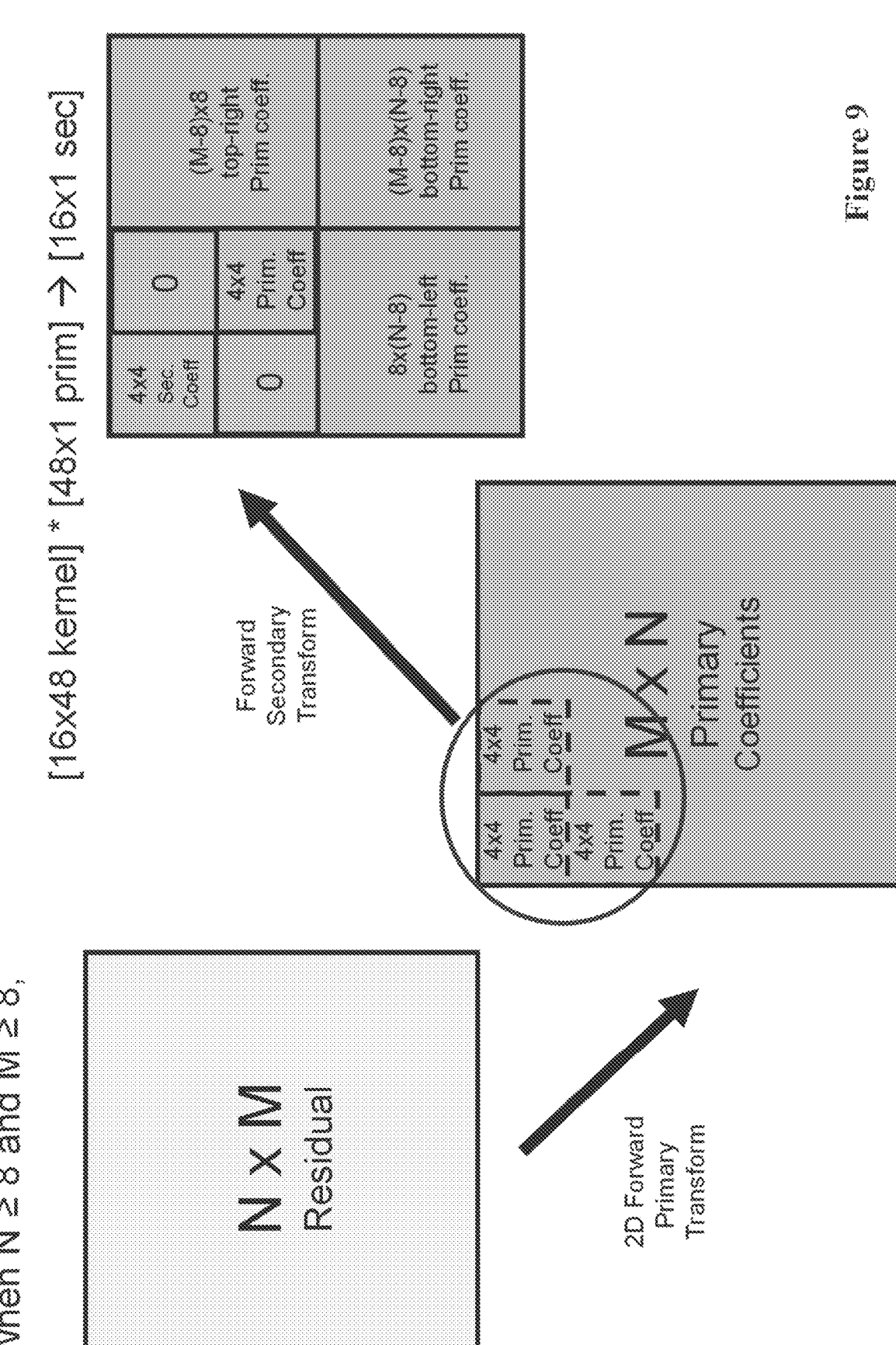
FIG. 9 illustrates an example of forward RST8×8 process with 16×48 matrix.

FIG. 9 illustrates an example of forward RST8×8 process with 16×48 matrix. In the adopted configuration 16×48 matrices are applied instead of 16×64 with the same transform set configuration, each of which takes 48 input data from three 4×4 blocks in a top-left 8×8 block excluding right-bottom 4×4 block (FIG. 4). With the help of the reduced dimension, memory usage for storing all RST matrices is reduced from 10 KB to 8 KB with reasonable performance drop.

Moreover, in VTM5, a coding tool called joint coding of chrominance residuals has been adopted. When this tool is activated, a single joint residual block is used to describe the residuals of both Cb and Cr blocks in the same transform unit as shown in Equation 1 (joint residual computed from Cb and Cr residuals)

$$res_{joint} = (res_{Cb} - res_{Cr})/2 \qquad \text{Eq. 1}$$

The Cb and Cr signals are then reconstructed by subtracting joint residual for Cb and adding it for Cr, as shown in Equation 2 (reconstruction of Cb and Cr signal from joint residual coding):

$$\begin{cases} res_{Cb} = pred_{Cb} + res_{joint} \\ rec_{cr} = pred_{Cr} - res_{joint} \end{cases} \qquad \text{Eq. 2}$$

A flag is coded at the TU level to enable the joint coding of chroma residual, if the flag is disabled, separate coding of Cb ad Cr residuals is used.

Embodiments described hereafter have been designed with the foregoing in mind. The encoder 100 of FIG. 1A, decoder 200 of FIG. 1B and system 1000 of FIG. 2 are adapted to implement at least one of the embodiments described below.

In at least one embodiment, the application is directed to a lossless coding mode in a video coding system comprising a plurality of coding tools, some of which are lossy by design, some of which can be adapted to become lossless or near lossless. To enable a lossless mode in a video coding system such as VVC for example, the following strategy is proposed:

Disable the tools that are lossy by design and use only lossless tools,

Adapt some tools to enable lossless coding,

Adapt some tools to enable near-lossless coding (the difference with the original signal being bounded and small) so that a secondary lossless coding may be applied after residual coding and thus provide lossless coding.

The lossless coding can be handled both at frame-level or at region-level.

FIGS. 10A and 10B illustrate an example flowchart according to at least an embodiment. The figure shows an example of general process to decide if a given tool should be disabled at frame level, block level, should be adapted to be lossless or if a secondary lossless coding should be performed to use this tool adapted to be near lossless. Such process can be implemented for example in the encoder device 100 of FIG. 1A.

In a first step (400 of FIG. 10A), it is evaluated if the tool is lossy by design or not.

If the tool lossy, a second check (402 of FIG. 10B) tests if the tool can be disabled at block-level or not (in which case it can only be controlled at frame-level).

If the tool cannot be disabled at block-level, the value of a flag transquant_bypass_enabled_flag (typically signalled at PPS level) is checked in step 404 of FIG. 10B. If transquant_bypass_enabled_flag is true, the tool is disabled in step 410 of FIG. 10B (this applies for example to LMCS). If transquant_bypass_enabled_flag is false, the tool is enabled in step 411 of FIG. 10B. Once either step 410 or 411 has applied, the process ends.

If the tool may be disabled at block level, the value of a CU-level flag cu_transquant_bypass_flag is checked in step 405 of FIG. 10B. If cu_transquant_bypass_flag is true, the tool is disabled at the CU-level in step 408 of FIG. 10B (this applies for example to SBT, MTS, LFNTS). If cu_transquant_bypass_flag is false, the tool may be enabled at the CU-level in step 409 of FIG. 10B. Once either step 408 or 409 has applied, the process ends.

If the tool is not lossy by design, a test is performed in step 401 of FIG. 10A to check is lossless or not.

If the tool is lossless, nothing special applies and the flow goes to the end of the process.

If the tool is not lossless, it is checked in step 403 of FIG. 10A if the tool is near-lossless.

If the tool is not near-lossless, as it is also not lossy by design, this means that it can be adapted to become lossless (step 406 of FIG. 10A). This may apply for instance to MTS with using only lossless transforms in the MTS transforms set.

If the tool is near-lossless, an additional (secondary) lossless coding step applies (step 407 of FIG. 10A). For instance, a lossless Transform without quantization can be applied.

Once either step 306 or 307 has applied, the process ends.

In the following of this disclosure, the application of this process to specific tools of the VVC specification is described.

Disabling of Tools Incompatible with Lossless Coding

This first case corresponds to steps 410 (picture-level) and 408 (CU-level) of FIG. 10A. A first element is related to Zero-out transform with large CUs. In an embodiment, the Zero-Out Transform cannot be used in case of lossless-coded CU or if Transform Skip is used. This is illustrated in the syntax specification in TABLE 4, which highlights in grey background the changes proposed compared to the current VVC syntax. If the block is bigger than max_actual_transf_size×max_actual_transf_size (in practice in current VVC version, 32×32) and is lossless-coded, then all the coefficients are coded, contrarily to the case of lossy-coded blocks where only a part of the coefficients is coded.

In practice, compared to the current VVC specification, the transform size limitation is only applied transform_skip_flag is false and cu_transquant_bypass_flag is false. TABLE 4 describes Modified syntax to not use Zero-Out transform if Transform Skip or lossless coding is used for the current CU):

TABLE 4

| | Descriptor |
|---|---|
| residual_coding( x0, y0, log2TbWidth, log2TbHeight, cIdx ) { | |
| if( ( tu_mts_idx[ x0 ][ y0 ] > 0 ‖ | |
|    ( cu_sbt_flag && log2TbWidth < | |
|    6 && log2TbHeight < 6 ) ) | |
|     && cIdx = = 0 && log2TbWidth > 4 ) | |
|   log2TbWidth = 4 | |
|  else if( !transform_skip_flag[ x0 ][ y0 ] && | |
|  !cu_transquant_bypass_flag[ x0 ][ y0 ]) { | |
|   log2TbWidth = Min( log2TbWidth, 5 ) | |
|  } | |
|  if( tu_mts_idx[ x0 ][ y0 ] > 0 ‖ | |
|    ( cu_sbt_flag && log2TbWidth < | |
|    6 && log2TbHeight < 6 ) ) | |
|    && cIdx = = 0 && log2TbHeight > 4 ) | |
|   log2TbHeight = 4 | |
|  else if( !transform_skip_flag[ x0 ][ y0 ] && | |
|  !cu_transquant_bypass_flag[ x0 ][ y0 ]) { | |
|   log2TbHeight = Min( log2TbHeight, 5 ) | |
|  } | |

In a variant, QuadTree Split is inferred or forced if the picture-level transquant_bypass_enabled_flag is enabled, and if the block is bigger than max_actual_transf_size×max_actual_transf_size (for example 32×32 in current VVC). In other words, when lossless coding is desired, blocks greater than 64×64 are systematically split so that the block size becomes 32×32 and thus is not subject to zeroing. TABLE 5 shows the modified syntax (QuadTree split inferred syntax in case lossless is enabled at picture level).

TABLE 5

| | Descriptor |
|---|---|
| coding_tree_unit( ) { | |
|  xCtb = ( CtbAddrInRs % PicWidthInCtbsY ) << CtbLog2SizeY | |
|  yCtb = ( CtbAddrInRs / PicWidthInCtbsY ) << CtbLog2SizeY | |
|  ....... | |
|  if( slice_type = = I && qtbtt_dual_tree_intra_flag ) | |
|   dual_tree_implicit_qt_split ( xCtb, yCtb, CtbSizeY, 0 ) | |
|  else if ( transquant_bypass_enabled_flag ) | |
|   transquant_implicit_qt_split ( xCtb, yCtb, CtbSizeY, CtbSizeY, 0) | |
|  else | |
|   coding_tree( xCtb, yCtb, CtbSizeY, CtbSizeY, 1, 0, 0, 0, 0, 0, SINGLE_TREE ) | |
| } | |
| transquant_implicit_qt_split( x0, y0, cbSize, cqtDepth ) { | |
|  cbSubdiv = 2 * cqtDepth | |
|  if( cbSize > 32 ) { | |
|   x1 = x0 + ( cbSize / 2 ) | |
|   y1 = y0 + ( cbSize / 2 ) | |

TABLE 5-continued

| | Descriptor |
|---|---|
| transquant_implicit_qt_split( x0, y0,<br>  cbSize / 2, cqtDepth + 1 )<br>  if( x1 < pic_width_in_luma_samples )<br>    transquant _implicit_qt_split( x1, y0,<br>    cbSize / 2, cqtDepth + 1 )<br>  if( y1 < pic_height_in_luma_samples )<br>    transquant _implicit_qt_split( x0, y1,<br>    cbSize / 2, cqtDepth + 1 )<br>  if( x1 < pic_width_in_luma_samples && y1 <<br>  pic_height_in_luma_samples )<br>    transquant _implicit_qt_split( x1, y1,<br>    cbSize / 2, cqtDepth + 1 )<br>  } else if (slice_type = = I && qtbtt_dual_tree_intra_flag) {<br>    coding tree(  x0,  y0,  cbSize,  cbSize,  1,<br>    cbSubdiv,  cqtDepth,  0,  0,  0,<br>        DUAL_TREE_LUMA )<br>    coding_tree(  x0,  y0,  cbSize,  cbSize,  0,<br>    cbSubdiv,  cqtDepth,  0,  0,  0,<br>        DUAL_TREE_CHROMA )<br>  }<br>  else {<br>    coding_tree( x0, y0, cbSize, cbSize, 1, cbSubDiv,<br>cqtDepth, 0, 0, 0, SINGLE_TREE )<br>  }<br>} | |

In another variant, cu_transquant_bypass_flag is coded only if the current CU is smaller or equal to max_actual_transf_size×max_actual_transf_size (for example 32×32 in current VVC). This means that bigger blocks cannot be lossless coded. TABLE 6 shows the associated syntax (proposed syntax to code cu_transquant_bypass only for block smaller or equal to 32×32)

TABLE 6

| | Descriptor |
|---|---|
| coding_unit( x0, y0, cbWidth, cbHeight, treeType ) {<br>  if( transquant_bypass_enabled_flag &&<br>  cbWidth <= 32 && cbHeight <= 32 )<br>    cu_transquant_bypass_flag[ x0 ][ y0 ]<br>  if( slice_type != I \| \| sps_ibc_enabled_flag)<br>    cu_skip_flag[ x0 ][ y0 ] | <br><br><br>ae(v)<br><br>ae(v) |

A second element is related to Sub-block Transform (SBT). As SBT uses a Transform tree subdivision with one of the Transform Unit inferred to have no residual, this tool cannot guarantee to reconstruct a CU with no loss. In an embodiment, SBT is disabled at the CU level when the lossless mode is activated (that is, when transquant_bypass_enabled_flag is true). The corresponding syntax change is shown in TABLE 7 (Coding Unit syntax when SBT is disabled for lossless coding CU). The decoding of the SBT-related syntax and the activation of SBT is only possible when transquant_bypass_enabled_flag is false.

TABLE 7

| | Descriptor |
|---|---|
| coding_unit( x0, y0, cbWidth, cbHeight, treeType ) {<br>...<br>  if( CuPredMode[ x0 ][ y0 ] != MODE_INTRA &&<br>  cu_skip_flag[ x0 ][ y0 ] = = 0 )<br>    cu_cbf<br>  if( cu_cbf ) {<br>    if(  CuPredMode[ x0 ][ y0 ]  !=  MODE_INTRA<br>&& sps_sbt_enable_flag && !<br>transquant_bypass_enabled_flag) { | <br><br><br><br><br>ae(v)<br><br><br><br> |

TABLE 7-continued

| | Descriptor |
|---|---|
|   if( cbWidth <= maxSbtSize &&<br>  cbHeight <= maxSbtSize ) {<br>    allowSbtVerHalf = cbWidth >= 8<br>    allowSbtVerQuad = cbWidth >= 16<br>    allowSbtHorHalf = cbHeight >= 8<br>    allowSbtHorQuad = cbHeight >= 16<br>    if(    allowSbtVerHalf          \| \|<br>    allowSbtHorHalf          \| \|<br>    allowSbtVerQuad \| \| allowSbtHorQuad )<br>      cu_sbt_flag[ x0 ][ y0 ]<br>  }<br>  if( cu_sbt_flag[ x0 ][ y0 ] ) {<br>    if(  (   allowSbtVerHalf          \| \|<br>    allowSbtHorHalf  )      &&<br>    ( allowSbtVerQuad \| \| allowSbtHorQuad ) )<br>      cu_sbt_quad_flag[ x0 ][ y0 ]<br>    if(   ( cu_sbt_quad_flag[ x0 ][ y0 ] &&<br>    allowSbtVerQuad && allowSbtHorQuad )<br>    \| \| ( !cu_sbt_quad_flag[ x0 ][ y0 ] &&<br>    allowSbtVerHalf && allowSbtHorHalf ) )<br>      cu_sbt_horizontal_flag[ x0 ][ y0 ]<br>      cu_sbt_pos_flag[ x0 ][ y0 ]<br>    }<br>  }<br>  transform_tree( x0, y0, cbWidth, cbHeight, treeType )<br>  }<br>} | <br><br><br><br><br><br><br><br><br>ae(v)<br><br><br><br><br><br>ae(v)<br><br><br><br><br><br>ae(v)<br>ae(v) |

In an alternative implementation, SBT can be used only as a TU tiling. In this embodiment, a residual may be coded for each sub-block, while in the initial design some blocks are forced to have coefficients of value 0. Horizontal and vertical transforms are inferred to transform skip. The corresponding syntax change is shown in TABLE 8 (Coding Unit syntax when no residual is not inferred for both TU in a SBT coded CU).

TABLE 8

| |
|---|
| transform_tree( x0, y0, tbWidth, tbHeight , treeType) {<br>  if( tbWidth > MaxTbSizeY \| \| tbHeight > MaxTbSizeY ) {<br>    trafoWidth = ( tbWidth > MaxTbSizeY ) ? (tbWidth / 2) :<br>    tbWidth<br>    trafoHeight = ( tbHeight > MaxTbSizeY ) ? (tbHeight / 2) :<br>    tbHeight<br>    transform_tree( x0, y0, trafoWidth, trafoHeight )<br>    if( tbWidth > MaxTbSizeY )<br>      transform_tree( x0 + trafoWidth, y0, trafoWidth,<br>      trafoHeight, treeType )<br>    if( tbHeight > MaxTbSizeY )<br>      transform_tree( x0, y0 + trafoHeight, trafoWidth,<br>      trafoHeight, treeType )<br>    if( tbWidth > MaxTbSizeY && tbHeight > MaxTbSizeY )<br>    transform_tree( x0 + trafoWidth, y0 + trafoHeight,<br>    trafoWidth, trafoHeight, treeType )<br>  } else if( cu_sbt_flag[ x0 ][ y0 ] ) {<br>    factorTb0 = cu_sbt_quad_flag[ x0 ][ y0 ] ? 1 : 2<br>    factorTb0 = cu_sbt_pos_flag[ x0 ][ y0 ] ? ( 4 - factorTb0 ) :<br>    factorTb0<br>    noResiTb0     =     (cu_sbt_pos_flag[ x0 ][ y0 ]     &&     !<br>transquant_bypass_enabled_flag )? 1 : 0<br>    if( !cu_sbt_horizontal_flag[ x0 ][ y0 ] ) {<br>      trafoWidth = tbWidth * factorTb0 / 4<br>      transform_unit( x0, y0, trafoWidth, tbHeight,<br>      treeType , noResiTb0 )<br>      transform_unit( x0 + trafoWidth, y0, tbWidth –<br>        trafoWidth, tbHeight, treeType , !noResiTb0 )<br>    }<br>    else {<br>      trafoHeight = tbHeight * factorTb0 / 4<br>      transform_unit( x0, y0, tbWidth, trafoHeight,<br>      treeType , noResiTb0 ) |

TABLE 8-continued

```
        transform_unit( x0, y0 + trafoHeight, tbWidth, tbHeight –
            trafoHeight, treeType , !noResiTb0 )
        }
    } else {
        transform_unit( x0, y0, tbWidth, tbHeight, treeType , 0 )
    }
}
```

Figure 11:
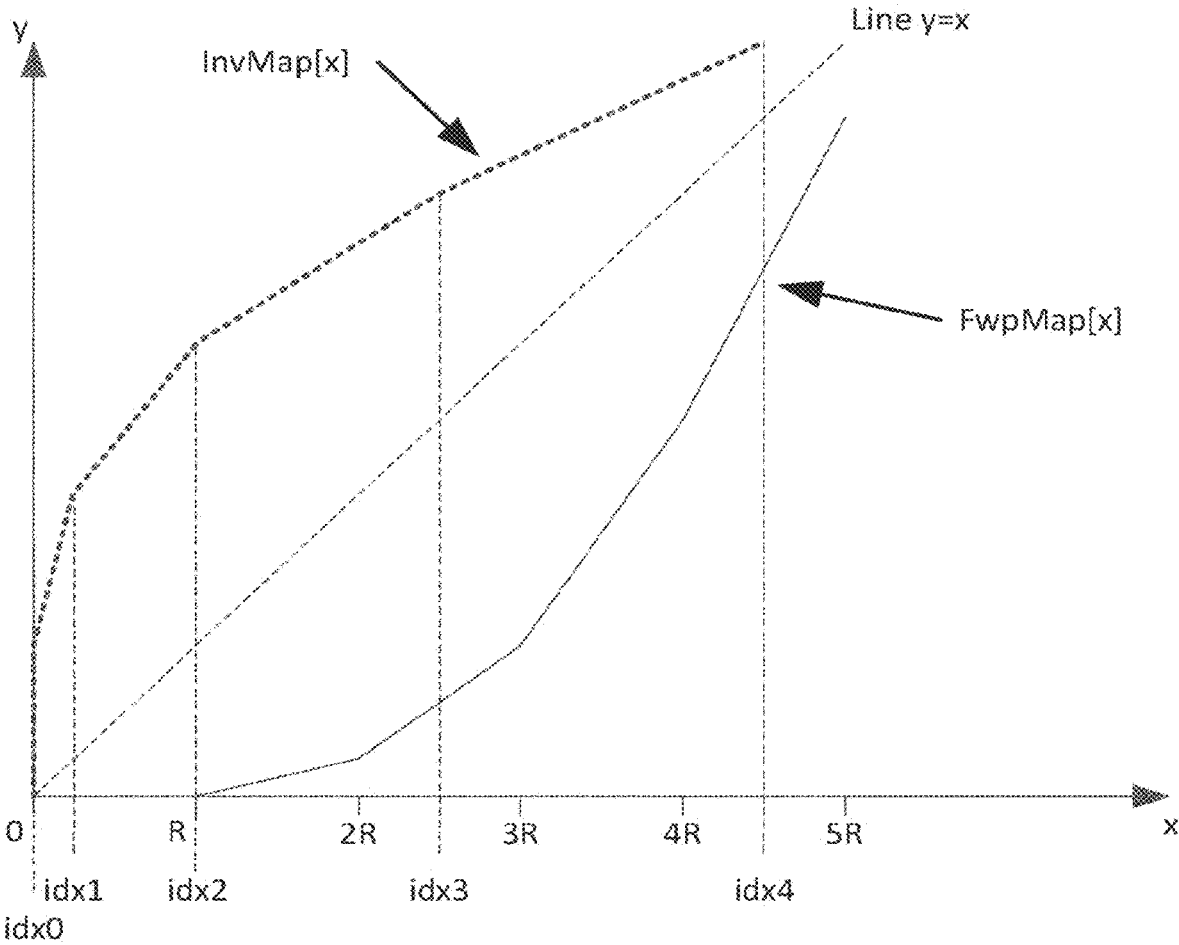
FIG. 11 illustrates the application of forward then inverse function for luma reshaping.

FIG. 11 illustrates the application of forward then inverse function for luma reshaping. Indeed, a third element is related to luma reshaping (LMCS). The reshaping is a lossy transformation because, due to rounding operations, the application of forward then inverse function is not guaranteed to give the original signal. In LMCS, the reference picture are stored in the original domain. In the intra case, the prediction process is achieved in the "reshaped" domain, and once the samples are reconstructed, the inverse reshaping applies, just before the loop-filtering steps. In the inter case, after motion compensation the predicted signal is forward reshaped. Then once the samples are reconstructed, the inverse reshaping applies, just before the loop-filtering steps.

In an embodiment, LMCS is disabled at slice-level if lossless coding is allowed in the PPS. The corresponding syntax change is shown in TABLE 9 (Slice Header syntax modification to disable lmcs if transquant bypass is enabled int the PPS).

TABLE 9

|  | Descriptor |
|---|---|
| slice_header( ) { |  |
|   slice_pic_parameter_set_id | ue(v) |
|   ........ |  |
|   if( sps_lmcs_enabled_flag_&& ! |  |
|   transquant_bypass_enabled_flag) { |  |
|     slice_lmcs_enabled_flag |  |
|     if( slice_lmcs_enabled_flag ) { |  |
|       slice_lmcs_aps_id |  |
|       if( !( qtbtt_dual_tree_intra_flag && |  |
|       slice_type = = I ) ) |  |
|         slice_chroma_residual_scale_flag |  |
| } |  |

A fourth element is related to Multiple Transform selection (MTS) and Transform Skip and an embodiment relates to inferring transform skip to true. DCT and DST transforms are lossy even if the quantization step is equal to 1, because of rounding errors that lead to slight losses. In a first embodiment, if a CU is lossless-coded (checked by the value of the CU-level flag cu_transquant_bypass_flag), only transform skip can be used. transform_skip_flag is inferred to 1 and tu_mts_idx is not coded. The corresponding syntax change is shown in TABLE 10 (Transform Unit syntax to disable coding of MTS and Transform skip when CU lossless is enabled). In the case transform_skip_flag is inferred to 1, residual coding for transform skip is used for lossless blocks is used.

TABLE 10

```
if( tu_cbf_luma[ x0 ][ y0 ] && treeType !=
DUAL_TREE_CHROMA
        && ( tbWidth <= 32 ) && ( tbHeight <= 32 )
        && ( IntraSubPartitionsSplit[ x0 ][ y0 ] = =
        ISP_NO_SPLIT ) && ( !cu_sbt_flag ) &&
&& !cu_transquant_bypass_flag ) {
    if( transform_skip_enabled_flag && tbWidth <= MaxTsSize
```

TABLE 10-continued

```
    && tbHeight <= MaxTsSize )
        transform_skip_flag[ x0 ][ y0 ]
    if(  (( CuPredMode[ x0 ][ y0 ] != MODE_INTRA &&
        sps_explicit_mts_inter_enabled_flag )
        | |   ( CuPredMode[ x0 ][ y0 ]   = =     MODE_INTRA
&& sps_explicit_mts_intra_enabled_flag ))
        && ( tbWidth <= 32 ) && ( tbHeight <= 32 ) &&
        ( !transform_skip_flag[ x0 ][ y0 ] ) )
        tu_mts_idx[ x0 ][ y0 ]
}
```

In VTM-5.0, two different residual coding process may be used, the first one is used for non-transform skip residual coding and is efficient for coding residual of natural content blocks, the second one is used for transform skip residual coding, efficient for coding screen content blocks. The residual coding syntax selection is shown in TABLE 11 (Residual coding syntax in VTM-5.0).

TABLE 11

```
if( tu_cbf_luma[ x0 ][ y0 ] ) {
    if( !transform_skip_flag[ x0 ][ y0 ] )
        residual_coding( x0, y0, Log2( tbWidth ), Log2( tbHeight ), 0 )
    else
        residual_ts_coding( x0, y0, Log2( tbWidth ),
        Log2( tbHeight ), 0 )
}
```

Figure 12:
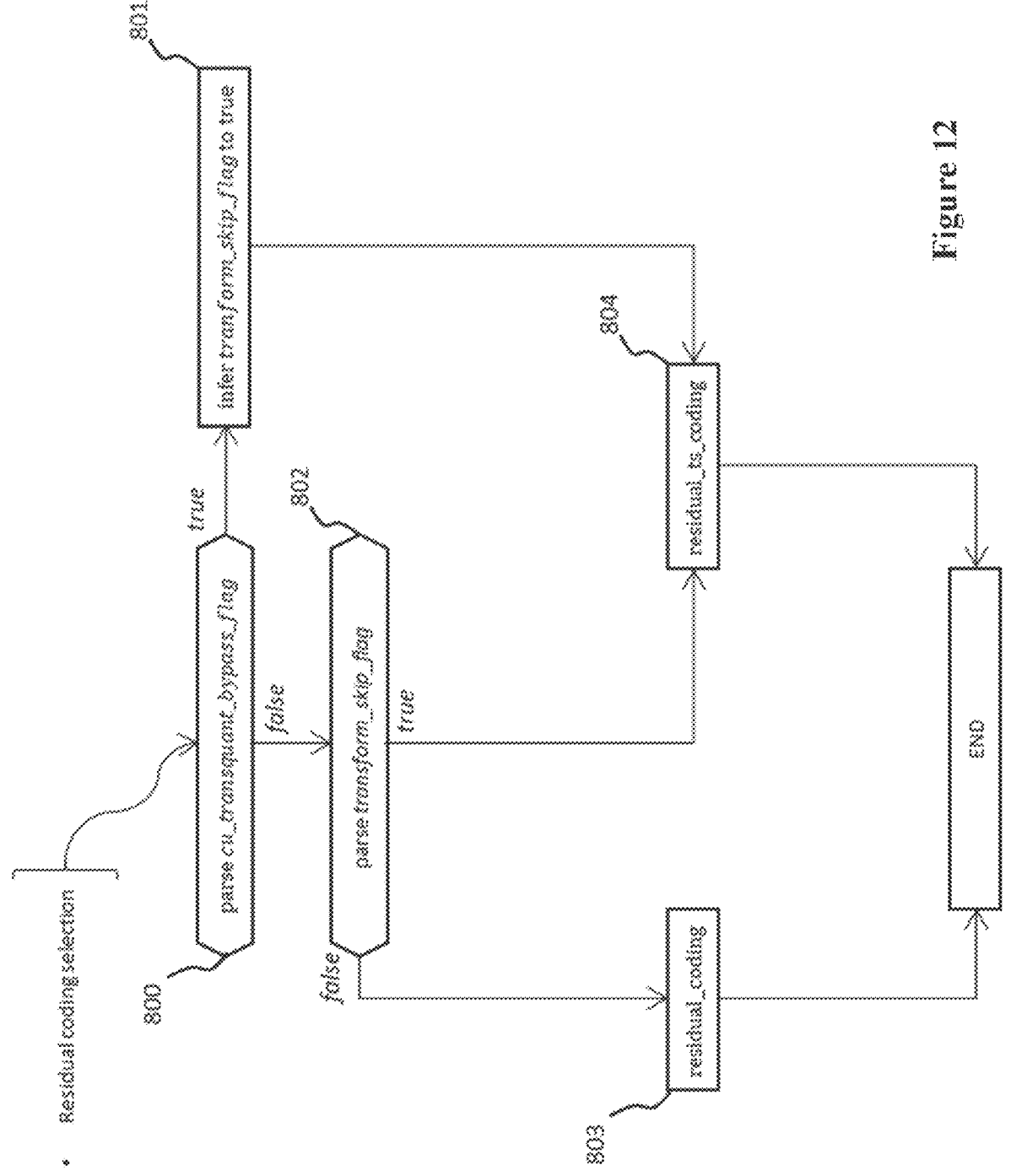
FIG. 12 illustrates an example flowchart of an embodiment that comprises parsing of cu_transquant_bypass_flag, transform_skip_flag and residual coding when transform skip is inferred to true for lossless coded blocks.

FIG. 12 illustrates an example flowchart of an embodiment that comprises parsing of cu_transquant_bypass_flag, transform_skip_flag and residual coding when transform skip is inferred to true for lossless coded blocks. In a first step 800, the cu_transquant_bypass_flag is parsed, it the flag is true the transform_skip_flag is inferred to true in step 801, else the transform_skip_flag is parsed in step 802. If transform_skip_flag is equal to false, regular residual is parsed in step 803 else if the flag is true, transform skip residual is parsed in step 804.

Figure 13:
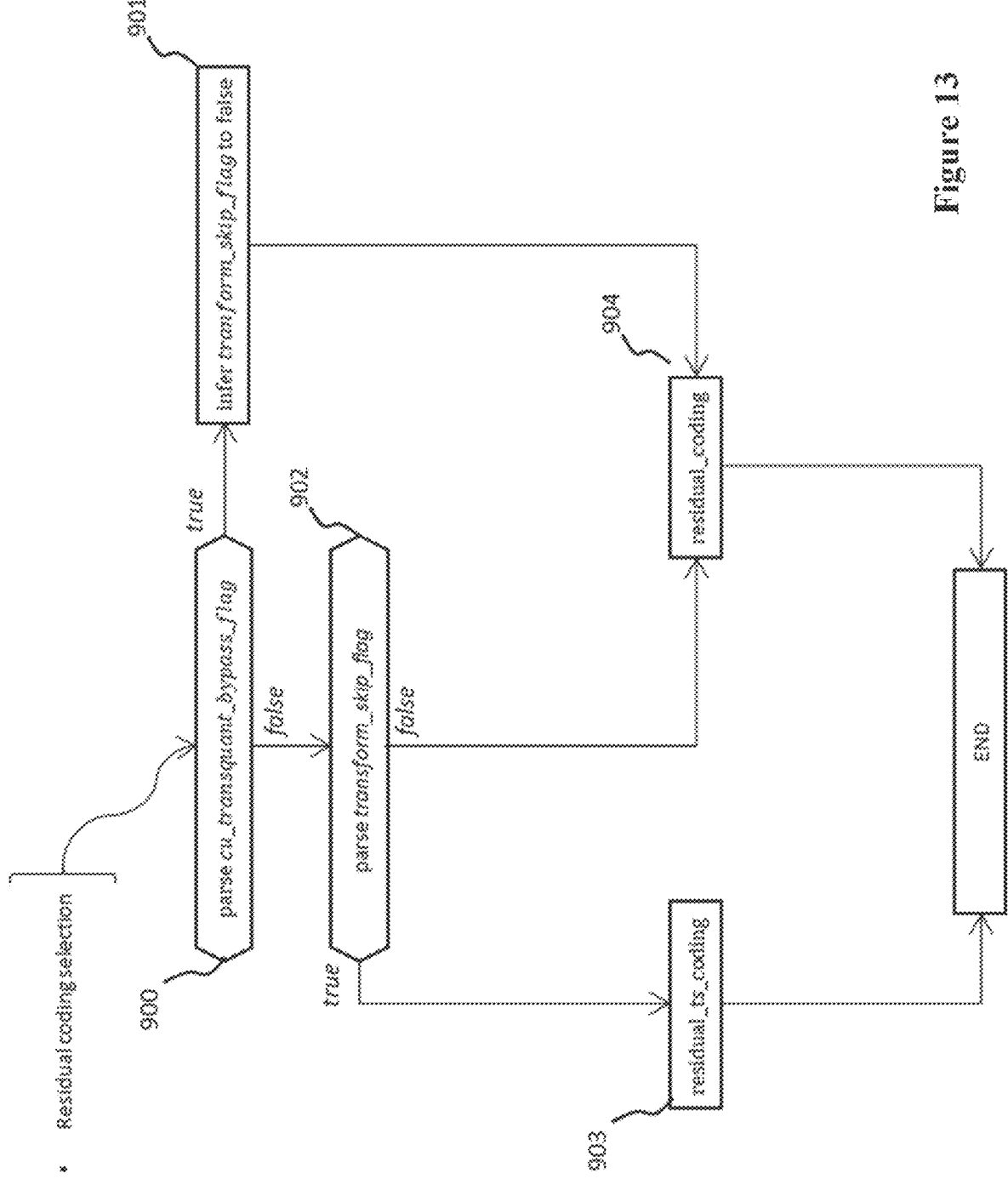
FIG. 13 illustrates an example flowchart of an embodiment that comprises parsing of cu_transquant_bypass_flag, transform_skip_flag and residual coding when transform skip is inferred to false for lossless coded blocks.

FIG. 13 illustrates an example flowchart of an embodiment that comprises parsing of cu_transquant_bypass_flag, transform_skip_flag and residual coding when transform skip is inferred to false for lossless coded blocks. In a first step 900, the cu_transquant_bypass_flag is parsed, it the flag is true the transform_skip_flag is inferred to false in step 901 and regular residual coding is used in step 904, else the transform_skip_flag is parsed in step 902. If transform_skip_flag is equal to false, regular residual is parsed in step 904 else if the flag is true, transform skip residual is parsed in step 903.

As residual coding for transform skip is design for coding residual from screen content coded blocks, it may be less efficient for coding natural content for lossless blocks. So, in another embodiment, if a CU is lossless-coded, transform_skip_flag is inferred to 0 and tu_mts_idx is not coded. The residual coding for regular transform is used for lossless coded blocks. Therefore, in this special mode (i.e. when cu_transquant_bypass_flag is true), regular coding will be used even in the case where transform_skip_flag is true whereas normally transform skip residual coding should be used when transform_skip_flag is true.

In other words, this embodiment described in FIG. 13 proposes to determine the type of residual coding by, in the case where an information indicates that a transform skip residual coding is used, obtaining a flag representative of a special mode, and when this flag is true, selecting regular residual coding for the residual coding, instead of transform skip residual coding that should be used. The flag representative of a special mode may be derived from other information, such as an indication that the coding is lossless (for example cu_transquant_bypass_flag), or an indication that the quantization, transform process and loop filter are bypassed (not used) or an indication that the residual coding is forced to regular residual coding.

Figure 14:
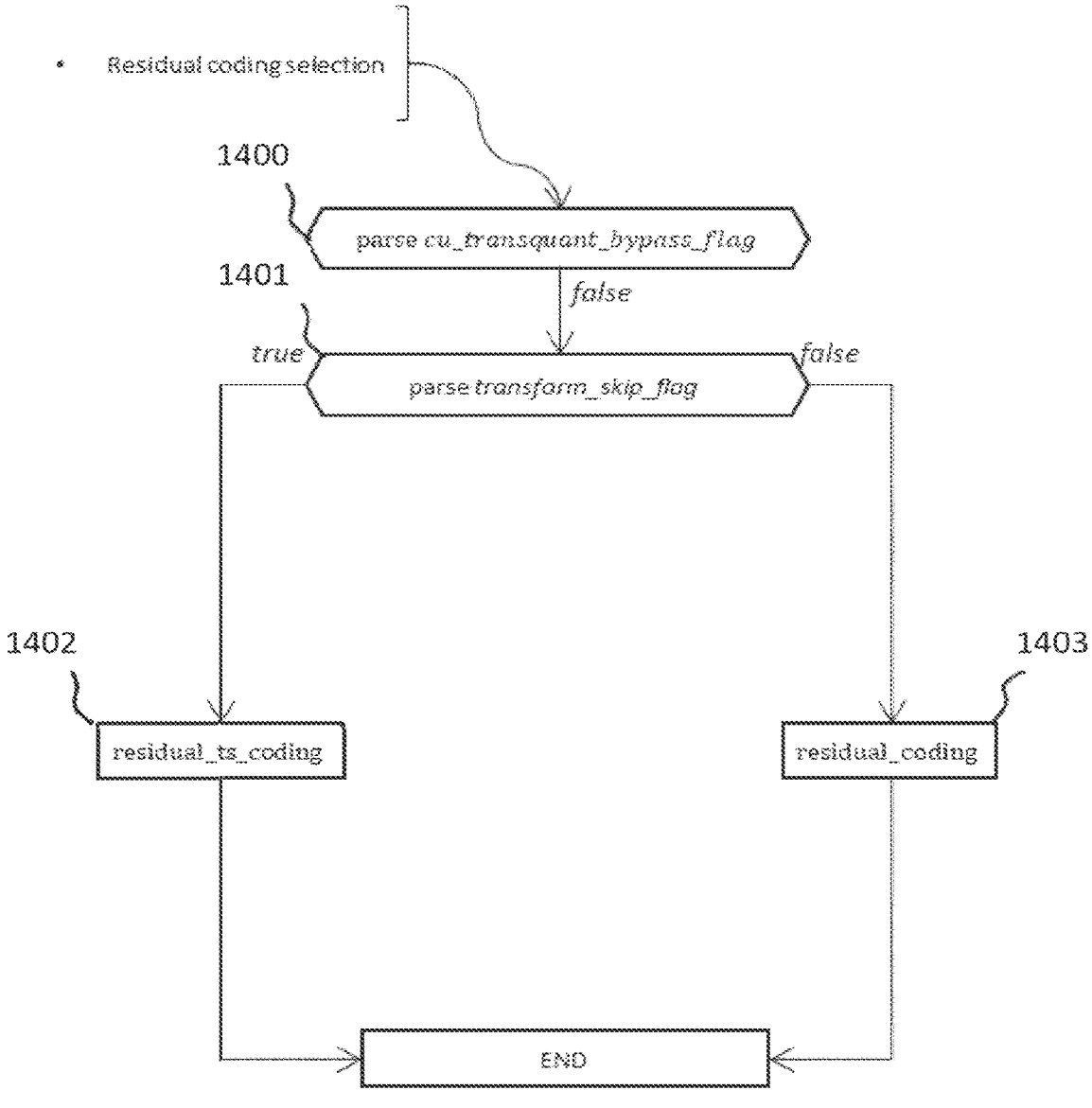
FIG. 14 illustrates an example flowchart of an embodiment that comprises parsing of cu_transquant_bypass_flag, transform_skip_flag and residual coding when transform skip is always parsed for lossless coded blocks.

FIG. 14 illustrates an example flowchart of an embodiment that comprises parsing of cu_transquant_bypass_flag, transform_skip_flag and residual coding when transform skip is always parsed for lossless coded blocks.

In such embodiment, to keep the design of lossless coded blocks close to lossy coded blocks, both normal residual coding and transform skip coding may be used. In this case the transform_skip_flag is coded for lossless coded blocks. This allow a competition between two different ways of coding the residual coefficients and better adapt the residual coding to the content.

In a first step 1400, the cu_transquant_bypass_flag is parsed, then the transform_skip_flag is parsed in step 1401. If transform_skip_flag is equal to false, regular residual is parsed in step 1403 else if the flag is true, transform skip residual is parsed in step 1402.

Indeed, the transform-skip residual coding method is optimized to code computer generated content where the correlation between the values of spatially adjacent coefficients is strong. In general, in lossy coding, the Transform-skip coefficient coding is mostly used when the content is computer generated and is effective with this kind of content.

But in this embodiment, it is proposed to use a flag to select between select the regular coefficient coding method and the transform-skip coefficient coding method. Indeed Transform-skip coefficient coding may be used for computer generated content, and regular coefficient coding method for regular content. This allow a competition between two different ways of coding the residual coefficients and better adapt the residual coding method to the content. This flag only changes the coefficient coding method used to code the residual of the block.

In VVC, 2 methods are used to code the residual:

the regular coefficient coding method is used when transformation and quantization are used. The method is inherited from HEVC plus some improvements, it has been designed to code residual after a transform where the energy is compacted in low-frequency part of the signal.

the transform-skip coefficient coding method is used when only quantization is used. The method has been designed for computer generated content where the transform is often skipped since there is a lot of spatial correlation between coefficients. Main characteristics of the Transform-skip residual coding method are that they don't signal the last non zero coefficient, start from the top-left corner of the block, use a reduce template of previous coefficients to code the current one and that the signs of the coefficients are Cabac context coded.

FIGS. 12, 13 and 14 show that unlike in the current VVC specification, the residual coding method may be decoupled from the fact that the transform has been skipped or not. Indeed in current VVC specification, transform_skip_flag syntax element equal to true means that no transform is applied to the residual of a block and transform skip coefficient coding method is used. Whereas in the proposed methods, the regular coefficient coding method is used if the current block is lossless coded (transform and quantization are skipped), by inferring transform_skip_flag to false, to use a better coefficient coding method in case of coding natural content. In a variant, even if cu_transquant_bypass_flag is true (in this case transform and quantization are skipped), a flag (here transform_skip_flag is reused for this purpose) is coded to only indicate which residual coding method is used.

An embodiment is related to Low Frequency Non-Separable Transform (LFNTS). In this embodiment, LFNTS is disabled if the current CU is lossless-coded. The corresponding syntax change is shown in TABLE 12 (Coding Unit syntax to disable Ifnts when CU is lossless coded).

TABLE 12

```
numZeroOutSigCoeff = 0
transform_tree( x0, y0, cbWidth, cbHeight, treeType )
if( Min( cbWidth, cbHeight ) >= 4 && sps_st_enabled_flag == 1
    && CuPredMode[ x0 ][ y0 ] == MODE_INTRA
    && IntraSubPartitionsSplitType == ISP_NO_SPLIT &&
    !cu_transquant_bypass_flap ) {
  if( ( numSigCoef > ( ( treeType == SINGLE_TREE ) ? 2 : 1 ) ) &&
      numZeroOutSigCoeff == 0 ) {
    st_idx[ x0 ][ y0 ]
  }
}
```

An embodiment is related to joint Cb-Cr coding. The process of joint coding of Cb and Cr residual is not invertible. By using Equation 1 and Equation 2 with resCb=resCr we have resjoint=0 and recCb=predCb and recCr=predCr. In an embodiment, joint Cb-Cr coding is disabled at CU level if cu_transquant_bypass_flag is true. The corresponding syntax change is shown in TABLE 13 (Residual coding syntax to disable joint Cb-Cr coding if cu_transquant_bypass_flag is true).

TABLE 13

| | Descriptor |
|---|---|
| residual_coding( x0, y0, log2TbWidth, log2TbHeight, cIdx ) { | |
|   if( cIdx == 2 && tu_cbf_cb[ x0 ][ y0 ] && | |
|   !cu_transquant_bypass_flag ) { | |
|     tu_cb_cr_joint_residual[ x0 ][ y0 ] | ae(v) |
|     if( tu_cb_cr_joint_residual [ x0 ][ y0 ] ) { | |
|       return | |
|   } | |
|   ... | |

When Equation 1 to separate resjoint_Cb and res Joint_Cr as in Equation 3 (Modification of joint residual computation proposed in N0347).

$$
\begin{cases}
res_{joint\_Cb} = (res_{Cb} - res_{Cr})/2 \\
res_{joint\_cr} = (res_{Cb} + res_{Cr})/2
\end{cases}
\qquad \text{Eq. 3}
$$

With this proposed modification, the process is invertible but lossy due to rounding errors, as shown in Equation 4 (Modification of the reconstruction of Cb and Cr signal from joint residual coding).

$$
\begin{cases}
rec_{Cb} = pred_{Cb} + res_{joint\_Cb} + res_{joint\_Cr} \\
rec_{cr} = pred_{Cr} - res_{joint\_Cb} + res_{joint\_Cr}
\end{cases}
\qquad \text{Eq. 4}
$$

This variant can be used for lossless-coding when a secondary lossless-coding process is performed as described hereafter.

Adaptation of VVC Tools for Lossless Coding

Referring to FIG. 10A, this case corresponds to step 406.

In an embodiment, lossless transforms are added in the MTS transform set. For lossless coding, those transforms shall be selected. Example of lossless transforms are the non-normalized Walsh-Hadamard transform, the non-normalized Haar transform. Example of near lossless transforms are the normalized Walsh-Hadamard transform, the normalized Haar transform.

Lossless transform can be obtained by either Walsh-Hadamard or Haar transform. The non-normalized transforms of Walsh-Hadamard and Haar are constructed from $+1$ and zeros, as shown in Equation 5 and Equation 6. For example, the non-normalized 4×4 Walsh-Hadamard matrix is as Equation 5 (Non-normalized 4×4 Walsh-Hadamard matrix):

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix} \qquad \text{Eq. 5}$$

While the non-normalized 4×4 Haar matrix is as Equation 6 (Non-normalized 4×4 Haar matrix):

$$\begin{bmatrix} 1 & 1 & 1 & 1 \\ 1 & 1 & -1 & -1 \\ 1 & -1 & 0 & 0 \\ 0 & 0 & 1 & -1 \end{bmatrix} \qquad \text{Eq. 6}$$

A lossless reconstruction can be achieved with either Walsh-Hadamard or Haar transform. To explain this, consider an example of 2×2 transform which takes to residual samples (r0 and r1). The transform matrix of both Haar and Walsh-Hadamard is as Equation 7 (Non normalized 2×2 Wash-Hadamard or Haar matrix):

$$\begin{bmatrix} 1 & 1 \\ 1 & -1 \end{bmatrix} \qquad \text{Eq. 7}$$

The transform coefficients (c0 and c1) are obtained by Equation 8 (Transform coefficients computed with 2×2 Walsh-Hadamard or Haar non-normalized transform):

$$\begin{bmatrix} c_0 \\ c_1 \end{bmatrix} = \begin{bmatrix} 1 & 1 \\ 1 & -1 \end{bmatrix} \times \begin{bmatrix} r_0 \\ r_1 \end{bmatrix} \qquad \text{Eq. 8}$$

The inverse transform is performed in this way. Equation 9 (Inverse transform with 2×2 Walsh-Transform or Haar non-normalized transform)

$$\begin{bmatrix} r_0 \\ r_1 \end{bmatrix} = \frac{1}{2} \times \begin{bmatrix} 1 & 1 \\ 1 & -1 \end{bmatrix} \times \begin{bmatrix} c_0 \\ c_1 \end{bmatrix} \qquad \text{Eq. 9}$$

In another example of 4×4 Walsh-Hadamard transform, for transforming of 4 residual samples (r0,r1,r2,r3), the matrix is multiplied by the coefficients vector to obtain the transform coefficients c0, c1,c2 and c3. Equation 10 (Transform Coefficients computed with 4×4 Walsh-Hadamard non-normalized transform):

$$\begin{bmatrix} c_0 \\ c_1 \\ c_2 \\ c_3 \end{bmatrix} = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \times \begin{bmatrix} r_0 \\ r_1 \\ r_2 \\ r_3 \end{bmatrix} \qquad \text{Eq. 10}$$

The inverse transform is performed in this way. Equation 11 (Inverse transform with 4×4 Walsh-Transform non-normalized transform):

$$\begin{bmatrix} r_0 \\ r_1 \\ r_2 \\ r_3 \end{bmatrix} = \frac{1}{4} \times \begin{bmatrix} 1 & 1 & 1 & 1 \\ 1 & 1 & -1 & -1 \\ 1 & -1 & -1 & 1 \\ 1 & -1 & 1 & -1 \end{bmatrix} \times \begin{bmatrix} c_0 \\ c_1 \\ c_2 \\ c_3 \end{bmatrix} \qquad \text{Eq. 11}$$

Finally, for transforming 4 residual samples using Haar transform, the following is used. Equation 12 (Transform Coefficients computed with 4×4 Haar transform):

$$\begin{bmatrix} c_0 \\ c_1 \\ c_2 \\ c_3 \end{bmatrix} = \begin{bmatrix} 1 & 1 & 1 & 1 \\ 1 & 1 & -1 & -1 \\ 1 & -1 & 0 & 0 \\ 0 & 0 & 1 & -1 \end{bmatrix} \times \begin{bmatrix} r_0 \\ r_1 \\ r_2 \\ r_3 \end{bmatrix} \qquad \text{Eq. 12}$$

The inverse transform is performed in this way. Equation 13: Inverse transform with 4×4 Haar non-normalized transform:

$$\begin{bmatrix} r_0 \\ r_1 \\ r_2 \\ r_3 \end{bmatrix} = \frac{1}{4} \times \begin{bmatrix} 1 & 1 & 1 & 0 \\ 1 & 1 & -1 & 0 \\ 1 & -1 & 0 & 1 \\ 1 & -1 & 0 & -1 \end{bmatrix} \times \begin{bmatrix} c_0 \\ c_1 \\ c_2 \\ c_3 \end{bmatrix} \qquad \text{Eq. 13}$$

The non-normalized Haar or Walsh-Hadamard transforms can sometimes increase the bitrate because the dynamic of the coefficients is increased. For example, when using the 4×4 non-normalized Walsh-Hadamard matrix, the coefficients energy can be up to 2 times the energy of the residual samples. Therefore, the normalized matrix is achieved by diving the non-normalized matrix by 2. However, doing so leads to loss in integer representation. Consider the same example for transforming 4 residual sample using "normalized" Walsh-Hadamard transform. Equation 14: Transform Coefficients computed with 4×4 Walsh-Hadamard normalized transform:

$$\begin{bmatrix} c_0 \\ c_1 \\ c_2 \\ c_3 \end{bmatrix} = \frac{1}{2} \times \begin{bmatrix} 1 & 1 & 1 & 1 \\ 1 & 1 & -1 & -1 \\ 1 & -1 & -1 & 1 \\ 1 & -1 & 1 & -1 \end{bmatrix} \times \begin{bmatrix} r_0 \\ r_1 \\ r_2 \\ r_3 \end{bmatrix} \qquad \text{Eq. 14}$$

since integer representation is used for the transform coefficients, the rounding causes an error of $+-\frac{1}{2}$. Therefore, an additional coding step is required code the reminder after division by 2. This can be done in the following way:

First, compute the reminder of division for each coefficient. Equation 15 (Reminder of division for each coefficient computed with 4×4 Walsh-Hadamard normalized transform $$\begin{cases} \text{rem\_}c_0 = 2 \times c_0 - (r_0 + r_1 + r_2 + r_3) \\ \text{rem\_}c_1 = 2 \times c_1 - (r_0 + r_1 - r_2 - r_3) \\ \text{rem\_}c_2 = 2 \times c_2 - (r_0 - r_1 - r_2 + r_3) \\ \text{rem\_}c_3 = 2 \times c_3 - (r_0 - r_1 + r_2 - r_3) \end{cases} \qquad \text{Eq. 15}$$

Where the reminders ($\text{rem\_}c_0$, $\text{rem\_}c_1$, $\text{rem\_}c_2$ and $\text{rem\_}c_3$) can take values of (−1, 0 or 1).

The reminders are then coded into the bitstream. First, encode significant reminder bit, which indicates if the reminder is not zero, then, if significant, encode the sign of the reminder (0 for negative and 1 for positive). The syntax is shown in TABLE 15. Differential Pulse-Code Modulation (DPCM) can also be used to make use of the correlation between the reminders. Once the reminders are decoded, the decoder can compute the inverse transform in this way. Equation 16 (Inverse transform with 4×4 Walsh-Hadamard normalized transform):

$$\begin{bmatrix} r_0 \\ r_1 \\ r_2 \\ r_3 \end{bmatrix} = \frac{1}{4} \times \begin{bmatrix} 1 & 1 & 1 & 1 \\ 1 & 1 & -1 & -1 \\ 1 & -1 & -1 & 1 \\ 1 & -1 & 1 & -1 \end{bmatrix} \times \begin{bmatrix} 2 \times c_0 + \text{rem\_}c_0 \\ 2 \times c_1 + \text{rem\_}c_1 \\ 2 \times c_2 + \text{rem\_}c_2 \\ 2 \times c_3 + \text{rem\_}c_3 \end{bmatrix} \qquad \text{Eq. 16}$$

This technique can be used for other transform sizes, but the normalization cannot always be achieved. For example, the Walsh-Hadamard transform matrix of size 2×2 requires a division by the square root of 2 for normalization, which always results in loss since the reminder part is not simply+− 0.5. However, the division by 2 like in 4×4 case is beneficial since it reduces the increased dynamic of the transform coefficient.

The technique is also applicable to Haar transform, although this technique does not lead to normalized transform due to the inhomogeneous norm of the Haar transform matrix. To illustrate, the 4×4 Haar transform is explained. Equation 17: Transform Coefficients computed with 4×4 Haar normalized transform:

$$\begin{bmatrix} c_0 \\ c_1 \\ c_2 \\ c_3 \end{bmatrix} = \frac{1}{2} \times \begin{bmatrix} 1 & 1 & 1 & 1 \\ 1 & 1 & -1 & -1 \\ 1 & -1 & 0 & 0 \\ 0 & 0 & 1 & -1 \end{bmatrix} \times \begin{bmatrix} r_0 \\ r_1 \\ r_2 \\ r_3 \end{bmatrix} \qquad \text{Eq. 17}$$

The reminders are computed in this way: Equation 18: Reminder of division for each coefficient computed with 4×4 Haar normalized transform:

$$\begin{cases} \text{rem\_}c_0 = 2 \times c_0 - (r_0 + r_1 + r_2 + r_3) \\ \text{rem\_}c_1 = 2 \times c_1 - (r_0 + r_1 - r_2 - r_3) \\ \text{rem\_}c_2 = 2 \times c_2 - (r_0 - r_1) \\ \text{rem\_}c_3 = 2 \times c_3 - (r_2 - r_3) \end{cases} \qquad \text{Eq. 18}$$

Where the reminders take values of (0, −1 and 1). On the decoder side, the decoded reminders are used in the inverse transform process in this way: Equation 19: Inverse transform with 4×4 Haar normalized transform:

$$\begin{bmatrix} r_0 \\ r_1 \\ r_2 \\ r_3 \end{bmatrix} = \frac{1}{4} \times \begin{bmatrix} 1 & 1 & 1 & 0 \\ 1 & 1 & -1 & 0 \\ 1 & -1 & 0 & 1 \\ 1 & -1 & 0 & -1 \end{bmatrix} \times \begin{bmatrix} 2 \times c_0 + \text{rem\_}c_0 \\ 2 \times c_1 + \text{rem\_}c_1 \\ 4 \times c_2 + \text{rem\_}c_2 \\ 4 \times c_3 + \text{rem\_}c_3 \end{bmatrix} \qquad \text{Eq. 19}$$

With Haar, Walsh-Hadamard, and no transform tools we can have multiple ways to transform the residual data in lossless manner. In total, we have 9 choices for the horizontal and vertical transform for two-dimensional residual signal. TABLE 14 provides the details:

TABLE 14

| Horizontal transform | Vertical Transform |
| --- | --- |
| Walsh-Hadamard | Walsh-Hadamard |
| Walsh-Hadamard | Haar |
| Walsh-Hadamard | No-Transform |
| Haar | Walsh-Hadamard |
| Haar | Haar |
| Haar | No-Transform |
| No-Transform | Walsh-Hadamard |
| No-Transform | Haar |
| No-Transform | No-Transform |

The straightforward way to utilize these transforms is make the encoder choose the best transform pair, which is the one the reduces the rate, and encode an index of the used pair so that the decoder can deduce the used pair and perform the inverse transformation.

In VTM, the current the transform pairs are either the core DCT2 transform for horizontal and vertical transform or the additional set of DST7 and DCT8 transform, known as Multiple transform selection (MTS). MTS can be switched on/off by a high-level flag. To be in line with this design, the default lossless transform is No-transform for both horizontal and vertical, and the "multiple transforms" are Walsh-Hadamard and Haar transform. They can also be controlled by a high-level flag "Lossless_MTS_Flag". The table of transform selection can therefore be modified to:

TABLE 15

| Lossless_MTS_Flag enabled | | Lossless_MTS_Flag disabled | |
| --- | --- | --- | --- |
| Horizontal Transform | Vertical Transform | Horizontal Transform | Vertical Transform |
| No-Transform | No-Transform | No-Transform | No-Transform |
| Haar | Haar | — | — |
| Walsh-Hadamard | Haar | — | — |
| Haar | Walsh-Hadamard | — | — |
| Walsh-Hadamard | Walsh-Hadamard | — | — |

Typically, the two non-normalized transforms fit well the residuals with small dimension. For example, they can be used up to size of 8×8 or 4×4.

Block-Level with Secondary Lossless Coding

Referring to FIG. 10A, this case corresponds to step 407.

If a CU is lossy coded but with an error bounded below a given threshold, typically if the absolute value of the error is smaller or equal to 1, as shown in Equation 20, an additional coding stage can be introduced to allow lossless coding. The error is measured as a difference between the original pixel and the reconstructed sample. Equation 20 (Bounded error of lossy Coding Unit for which a secondary lossless coding may be applied):

$$-1 \leq \text{error} \leq 1 \qquad \text{Eq. 20}$$

For example, if DCT or DST transform is used with a quantization step equal to 1, a secondary lossless coding may be applied after lossy coding.

Figure 15:
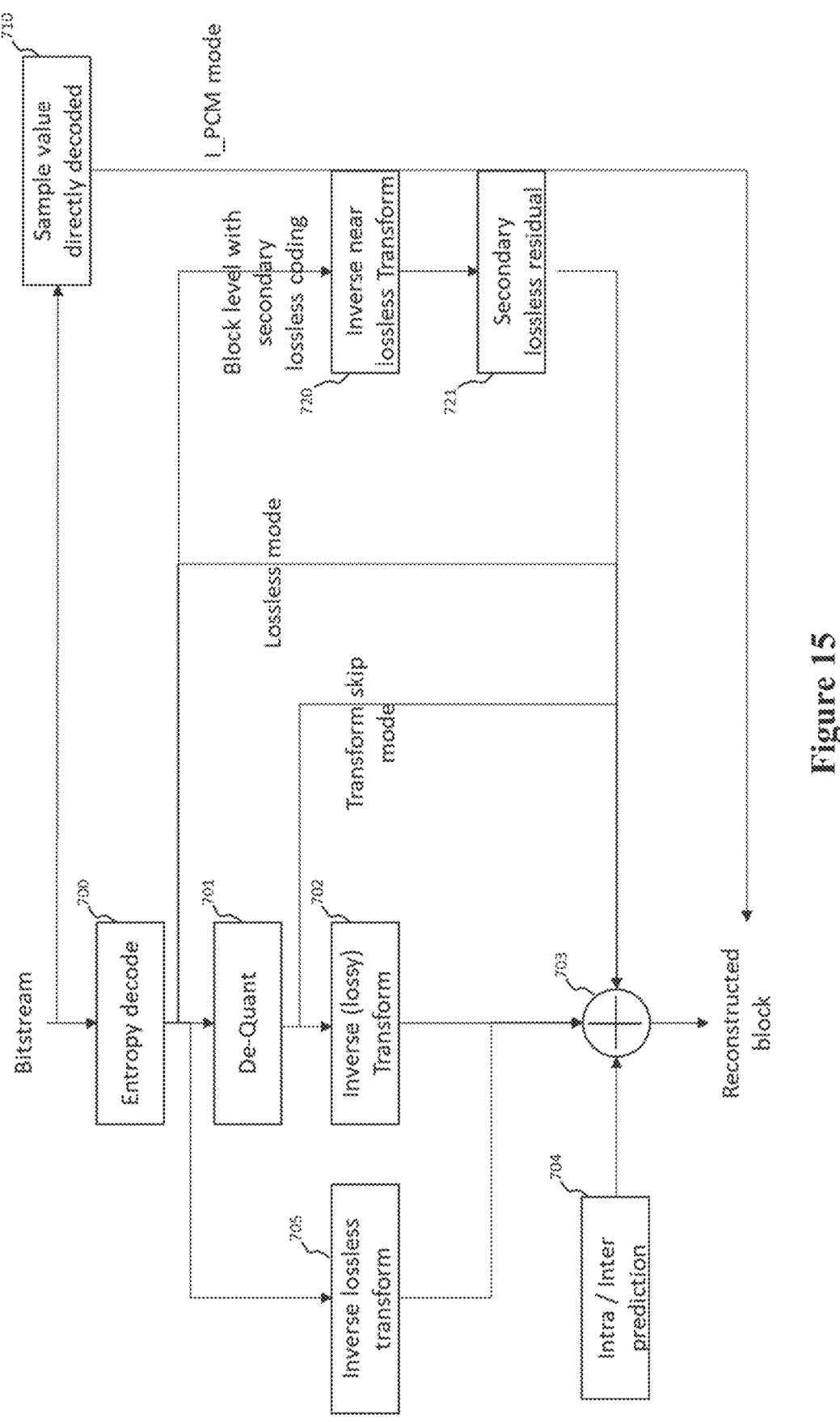
FIG. 15 illustrates an example of simplified block diagram of secondary lossless coding.

FIG. 15 illustrates an example of simplified block diagram of secondary lossless coding. The input of the process is the bitstream. Data are decoded from the bitstream in step 700. In particular this provides the quantized transformed coefficients, the transform type and the newly introduced secondary coefficients. The inverse quantization is applied in step 701 to the quantized transformed coefficients. The inverse transform is applied in step 702 to the resulting transformed coefficients. The resulting residual is added in step 703 to the prediction signal, coming from the intra or inter prediction of step 704. The result is the reconstructed block. When I_PCM mode is selected in step 710, the samples values are directly decoded without entropy decoding. When lossless coding mode is selected, steps 701 and 702 are skipped. When transform skip mode is selected, step 702 is skipped. When the block level with secondary transform mode is selected, the step 701 is skipped, inverse transform is applied in step 720 to obtain the first residual, the secondary lossless residual is added to the first residual. The resulting sum of residual is then added in step 703 to the predicted signal.

As the error is bounded below a given threshold, the syntax to code this small residual is very simple, basically if the threshold is 1, only a significant flag and a sign flag may be necessary to code the secondary residual, the syntax is shown in TABLE 16 (Secondary residual syntax for a threshold of 1):

TABLE 16

| | De-scrip-tor |
|---|---|
| Secondary_residual_coding( x0, y0, log2TbWidth, log2TbHeight) { | |
|     for( i = 0; i < (1<<log2TbHeight); i++ ) { | |
|         for( j = 0; j < (1<<log2TbWidth); j++ ) { | |
|           secondary_significant_flag[ x0 + j ][ y0 + i ] | ae(v) |
|           if(secondary_significant_flag[ x0 + j ][ y0 + i ] ) { | |
|             secondary_sign_flag[ x0 + j ][ y0 + i ] | |
|           } | |
|         } | |
|     } | |
| } | |
| ... | |

This secondary lossless coding may also be applied by region instead of by block.

Region Level Signalling

In the use case of lossless coding, it is very likely to code a whole region in lossless, and not to have some lossless coded blocks mixed up with lossy coded blocks. To handle such cases, the actual syntax needs to code the cu_transquant_bypass_flag for each CU which can be costly. In a first embodiment, we propose to move the flag and coded it before the split_cu_flag so that all the child CU from a parent CU may share the region_transquant_bypass_flag, the associated syntax is shown in TABLE 17 (Proposed syntax of region_transquant_bypass_flag).

TABLE 17

| | De-scrip-tor |
|---|---|
| coding_tree( x0, y0, cbWidth, cbHeight, qgOn, cbSubdiv, | |
|         cqtDepth, mttDepth, depthOffset, partIdx, | |
|         treeType, isRegionTransquantCoded, | |
|         isRegionTransquant ) { | |

TABLE 17-continued

| | De-scrip-tor |
|---|---|
|   if( transquant_bypass_enabled_flag && | |
|   !isRegionTransquantCoded ) { | |
|     region_transquant_bypass_flag | ae(v) |
|     isRegionTransquantCoded = true | |
|     isRegionTransquant = region_transquant_bypass_flag | |
|   } | |
|   if( ( allowSplitBtVer \|\| allowSplitBtHor \|\| allowSplitTtVer \|\| | |
| allowSplitTtHor \|\| allowSplitQT ) | |
|     &&( x0 + cbWidth <= | |
|     pic_width_in_luma_samples ) | |
|     && (y0 + cbHeight <= pic_height_in_luma_samples ) ) | |
|     split_cu_flag | ae(v) |
|   if( split_cu_flag ) { | |
|     .... | |
|     coding_tree( x0, y0, cbWidth / 4, cbHeight, qgOn, | |
|         cbSubdiv + 2, cqtDepth, mttDepth + 1, | |
|   depthOffset, 0, treeType, isRegionTransquant ) | |
|     coding_tree( x1, y0, cbWidth / 2, cbHeight, qgOn, | |
|         cbSubdiv + 1, cqtDepth, mttDepth + 1, | |
|   depthOffset, 1, treeType, isRegionTransquant ) | |
|     ..... | |
|   } else { | |
|     coding_unit( x0, y0, cbWidth, cbHeight, treeType, | |
|     isRegionTransquant ) | |
|   } | |

Figure 16:
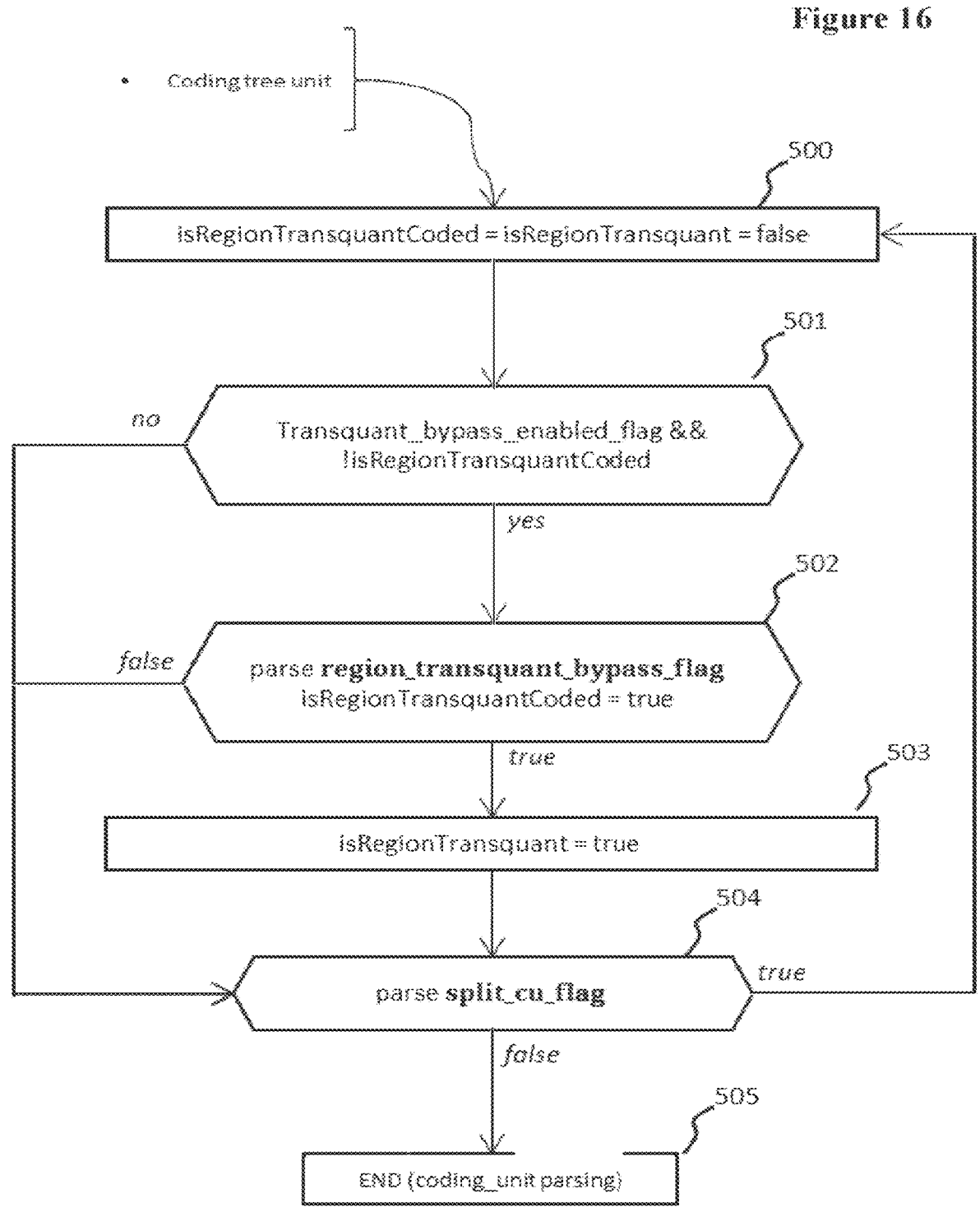
FIG. 16 illustrates an example flowchart of the parsing process for region_transquant_bypass_flag and the split_cu_flag when region-level signaling is used.

FIG. 16 illustrates an example flowchart of the parsing process for region_transquant_bypass_flag and the split_cu_flag when region-level signaling is used. When parsing the syntax for a Coding Tree Unit, the first step (500) is to initialize the two variables, isRegionTransquantCoded that indicate if a flag to indicate lossless coding has already been coded for the current region and isRegionTransquant that indicate if the current region is lossless coded, to false. Then step 501 checks if the lossless coding is enabled at picture level (Transquant_bypass_enabled_flag is true) and the region_transquant_bypass_flag has not been yet coded for the current region (isRegionTransquantCoded is false). If those conditions are true, the flag region_transquant_bypass_flag is parsed in step 502. Otherwise step 504 parses the split_cu_flag. After step 502, step 503 checks if the region_transquant_bypass_flag is true. If region_transquant_bypass_flag is true, the variable isRegionTransquant is set to true in step 504. Then the split_cu_flag is parsed in step 504. If the split_cu_flag is true, the process goes back to step 500, otherwise the tree is no more split and the process ends (step 505). The syntax of the current coding unit may be parsed.

Lossless Coding in Case of Dual Tree

Figure 17:
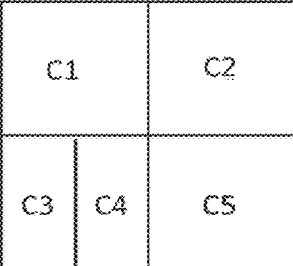
FIG. 17 illustrates different partitions for Luma and Chroma in case of dual tree.

FIG. 17 illustrates different partitions for Luma and Chroma in case of dual tree. In VVC, a coding structure called Dual Tree allows to code separately the trees for Luma and Chroma for Intra slices.

In an embodiment, the cu_transquant_bypass_flag is parsed for each tree separately, allowing for more flexibility to signal lossless coding.

In a variant embodiment, the cu_transquant_bypass_flag is not coded for the chroma Tree, but inferred from the luma tree. For a given chroma CU, if one of the collocated luma CU is lossless coded, the current chroma CU is also lossless coded. The figure shows different partitions for Luma and Chroma trees, for example if Luma CU L4 is lossless coded, chroma CU C3 and C4 are lossless coded. In another example, if Luma CU L3 is lossess coded, chroma CU C2 is also lossless coded even if the collocated Luma CU L2 is not.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 1A, 1B and 2 provide some embodiments, but other embodiments are contemplated and the discussion of these figures does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation and motion estimation modules (170, 175, 275), of a video encoder 100 and decoder 200 as shown in FIG. 1A and FIG. 1B. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, tablets, smartphones, cell phones, portable/personal digital assistants, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

In the present application, the terms "reconstructed" and "decoded" may be used interchangeably, the terms "pixel" and "sample" may be used interchangeably, the terms "image," "picture", "frame", "slice" and "tiles" may be used interchangeably. Usually, but not necessarily, the term "reconstructed" is used at the encoder side while "decoded" is used at the decoder side.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of an illumination compensation parameter. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method comprising:
   obtaining a first flag indicating that a block of pixels of an image or video is a transform skip block, wherein transform skip residual coding should be used for coding a transform block associated with the block of pixels of the image or video;
   obtaining a second flag indicating that regular residual coding is used for transform skip blocks;
   decoding coefficients of the transform block using regular residual coding; and
   decoding the block using the decoded coefficients.

2. A non-transitory computer readable medium having instructions stored thereon which, when executed by one or more processors, cause the one or more processors to perform the method of claim 1.

3. An apparatus for decoding coefficients for a block of pixels of an image or video comprising a processor configured to:
   obtain a first flag indicating that a block of pixels of an image or video is a transform skip block, wherein transform skip residual coding should be used for coding a transform block associated with the block of pixels of the image or video;

obtain a second flag indicating that regular residual coding is used for transform skip blocks;

decode coefficients of the transform block using regular residual coding; and decode the block using the decoded coefficients.

4. A method comprising:

based on a rate distortion optimization, for a block of pixels of an image or video, determining that transform skip and residual coding should be used;

encoding coefficients of the block using regular residual coding; and encoding a first flag indicating that the block of pixels of the image or video is a transform skip block and a second flag indicating that regular residual coding is used for transform skip blocks.

5. A non-transitory computer readable medium having instructions stored thereon which, when executed by one or more processors, cause the one or more processors to perform the method of claim 4.

6. An apparatus comprising a processor configured to:

based on a rate distortion optimization, determine that transform skip and residual coding should be used for a block of pixels of an image or video; and on a condition that transform skip and residual coding should be used:

encode coefficients of the block using regular residual coding; and encode a first flag indicating that the block of pixels of the image or video is a transform skip block and a second flag indicating that regular residual coding is used for transform skip blocks.

\* \* \* \* \*